(12) United States Patent
Chen et al.

(10) Patent No.: US 11,675,066 B2
(45) Date of Patent: Jun. 13, 2023

(54) MOTION DETECTION AND CLASSIFICATION USING AMBIENT WIRELESS SIGNALS

(71) Applicants: Biao Chen, Syracuse, NY (US); Yang Liu, Syracuse, NY (US); Tiexing Wang, Syracuse, NY (US)

(72) Inventors: Biao Chen, Syracuse, NY (US); Yang Liu, Syracuse, NY (US); Tiexing Wang, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 246 days.

(21) Appl. No.: 16/988,204

(22) Filed: Aug. 7, 2020

(65) Prior Publication Data
US 2021/0041548 A1 Feb. 11, 2021

Related U.S. Application Data

(60) Provisional application No. 62/976,320, filed on Feb. 13, 2020, provisional application No. 62/896,307, filed on Sep. 5, 2019, provisional application No. 62/884,218, filed on Aug. 8, 2019.

(51) Int. Cl.
*G01S 13/00* (2006.01)
*G01S 7/41* (2006.01)
*G01S 13/56* (2006.01)

(52) U.S. Cl.
CPC ............ *G01S 13/003* (2013.01); *G01S 7/417* (2013.01); *G01S 13/56* (2013.01)

(58) Field of Classification Search
CPC ......... G01S 13/003; G01S 7/417; G01S 13/56
See application file for complete search history.

(56) References Cited

U.S. PATENT DOCUMENTS

| | | | |
|---|---|---|---|
| 9,019,148 B1* | 4/2015 | Bikhazi | G01S 7/411 342/28 |
| 10,264,405 B1* | 4/2019 | Manku | G01S 13/003 |
| 2019/0178980 A1* | 6/2019 | Zhang | G01S 7/415 |
| 2021/0352441 A1* | 11/2021 | Liu | H04B 17/318 |
| 2022/0026531 A1* | 1/2022 | Wu | G01S 13/46 |

OTHER PUBLICATIONS

Alibi "2D Direction of Arrival Estimation using Channel State Information for UCA", Joint International Information Technology, Mechanical and Electronic Engineering Conference (JIMEC 2016) (Year: 2016).*
WIPO document of Priority U.S. Appl. No. 62/809,388 (Year: 2019).*

* cited by examiner

*Primary Examiner* — Timothy A Brainard
*Assistant Examiner* — Helena H Seraydaryan
(74) *Attorney, Agent, or Firm* — David Nocilly

(57) ABSTRACT

A system for using radio frequency (RF) communication signals to extract situational awareness information thorough deep learning. Pre-processing is performed to maximally preserve discriminating features in spatial, temporal and frequency domains. A specially designed neural network architecture is used for handling complex RF signals and extracting spatial, temporal and frequency domain information. Data collection and training is used so that the learning system desensitizes from features orthogonal to the underlying classification problem.

10 Claims, 25 Drawing Sheets

Test 1

Test 2 one mixture run on day 9

MOTION DETECTION AND CLASSIFICATION USING AMBIENT WIRELESS SIGNALS

CROSS-REFERENCE TO RELATED APPLICATIONS

The present application claims priority to U.S. Provisional Application No. 62/884,218, filed on Aug. 8, 2019, U.S. Provisional Application No. 62/896,307, filed on Sep. 5, 2019, U.S. Provisional Application No. 62/976,320, filed on Feb. 13, 2020.

BACKGROUND OF THE INVENTION

1. Field of the Invention

The present invention relates to moving object identification and, more specifically to an approach for analyzing ambient wireless signal through machine learning to detect movement of objects and identify moving objects of interest within the wireless environment.

2. Description of the Related Art

Presence detection plays a key role in improving building efficiency and reducing carbon footprint, especially for office buildings. The use of occupancy information in controlling Heating, Ventilation, and Air Conditioning (HVAC) and lighting systems has become increasingly prevalent especially for commercial and office buildings. Existing methods for human presence detection include Passive Infra-Red (PIR) sensors, microwave sensors, cameras, $CO_2$ sensors and RFID, among others. Microwave sensors are overly sensitive as they tend to have frequent false alarms, e.g., detecting movements from humans/objects outside of intended coverage areas. $CO_2$ sensors have a slow response time, in addition to its cost barrier. Cameras raise privacy concerns and is sensitive to lightning conditions. RFID requires wearable sensors/devices which can be cumbersome for users. Among the most widely deployed methods for presence detection is PIR sensors, which pick up infrared emission using its onboard pyroelectric sensor and detect movement of humans (or objects) through variation in infrared within the field of view. Its drawback is its low sensitivity and limited coverage (field of view). As such, PIR sensors are mostly used for isolated lighting control.

Exploiting ambient RF, e.g., WiFi signals, for detecting, localizing, tracking, and identifying human motion/activities have been explored in the literature quite extensively. Early work for indoor RF sensing mainly relies on received signal strength indicator (RSSI). RSSI measures instantaneous attenuation of RF signals at the receiver and its variation in time (i.e., temporal domain behavior) can be associated with motion/activities of human/objects. More recently, more fine-grained features and in particular the channel state information has been used for RF sensing. For example, different human activities, such as running, walking and eating, are recognized by analyzing their unique impact on the CSI. Another interesting application is in gesture classification, e.g., the SignFi system uses CSI extracted from WiFi signals to classify 276 sign gestures with high accuracy. Other examples include indoor localization and tracking that captures movement through CSI variation.

There is an important distinction between presence detection and detection of particular activities (e.g., sign language or fall detection). For the detection of particular activities, one can use a model-based approach—certain activities, e.g., falls, will impose a certain signature on RF propagation thus hand-crafted features extracted from received signals can be used for activity detection. Alternatively, a data driven approach can be used where collected training data are fed to machine learning algorithms (e.g., a neural network) to learn to discriminate different states (labels) corresponding to the input data. For presence detection, however, there is no defined activities when human beings are present; thus, a model based approach is not adequate. While a data driven approach appears to be a natural choice here, it is unclear a priori what would be the best way to collect training data for presence detection. Perhaps the only reasonable assumption that one can make for presence detection is that humans are not expected to be completely still for an extended period of time. While in theory systems can detect human presence without the need of human motion, their usage is quite restricted as the performance is rather sensitive to environment change (e.g., furniture move) or human locations.

Exploiting CSI of RF communications for presence detection has also been studied in the literature. While both amplitude and phase of CSI have been used, the majority of the work only utilizes the amplitude of CSI. The argument is that the phase information is much noisier due to either estimation error or inherent impediments such as carrier frequency offset (CFO) and sampling time offset (STO). For example, cross correlation in time of CSI amplitude has been used since motions tend to decrease temporal correlation of CSI. A conventional system based on this approach achieves occupancy detection by computing the temporal similarity between CSI across frequency (subcarriers), but it can only detect walking across line of sight (LOS). Other systems utilize support vector machine (SVM) to detect motion; but the inputs to the SVM come from CSI time series after dimensionality reduction through principal components analysis. Accordingly, there remains a need in the art for a system that can accurately and reliably identify indoor human occupancy using ambient RF in a consistent manner to make it commercially viable.

BRIEF SUMMARY OF THE INVENTION

The present invention used ambient radio frequency signals for presence detection. In particular, the present invention uses ambient WiFi signals given their ubiquity in almost all indoor environment nowadays. An added benefit of using WiFi is its physical layer waveform. Current and future WiFi systems employ multiple-input and multiple-output orthogonal frequency-division multiplexing (MIMO-OFDM) communications. As such, the CSI contains rich information about the ambient environment in both spatial and frequency domains that can greatly enhance detection performance relying only on temporal domain channel characteristics. Through passive WiFi sensing, reliable presence detection can be achieved. Integrating such capability in existing WiFi receivers (e.g., computers, routers) would provide a low-cost, device-free and non-intrusive alternative to existing sensing systems.

In a first embodiment, the present invention is a system for detecting motion using ambient radio frequency signals. The system has a receiver having at least one antenna for receiving a series of ambient radio frequency signals. The system also has a processor associated with the receiver that is programmed to process the series of ambient radio frequency signals to obtain a series of channel state information arrays, to construct a channel state image by stacking the series of channel state information arrays, to process the channel state information image to form a channel state information phase image and a channel state information magnitude image, to independently process the channel state information phase image with a first convolutional neural network and the channel state information magnitude image with a second convolutional neural network, and to concatenate the results of the first convolutional neural network and the second convolutional neural network to provide an output layer indicating whether motion has been detected. The output layer indicating whether motion has been detected is based on the variation of amplitude and phase of the series of ambient radio frequency signals over time. The first convolutional neural network comprises at least one convolution layer, at least one pooling layer, and at least one dropout layer. The second convolutional neural network comprises at least one convolution layer, at least one pooling layer, and at least one dropout layer. The processor is programmed to concatenate the results of the first convolutional neural network and the second convolutional neural network using at least one fully connected layer. The channel state information image has a sampling interval selected from the group consisting of 10 milliseconds, 20 milliseconds, and 40 milliseconds. The first convolutional neural network and the second convolutional neural network were trained using a set of training data obtained from at least one object moving within a location having the series of ambient radio frequency signals.

In another embodiment, the present invention is a method detecting motion using ambient radio frequency signals. The method includes the steps of providing a receiver having at least one antenna for receiving a series of ambient radio frequency signals, using a processor associated with the receiver that is programmed to process the series of ambient radio frequency signals to obtain a series of channel state information arrays, using the processor to construct a channel state image by stacking the series of channel state information arrays, using the processor to process the channel state information image to form a channel state information phase image and a channel state information magnitude image, using the processor to independently process the channel state information phase image with a first convolutional neural network and the channel state information magnitude image with a second convolutional neural network, and using the processor to concatenate the results of the first convolutional neural network and the second convolutional neural network to provide an output layer indicating whether motion has been detected.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 4:
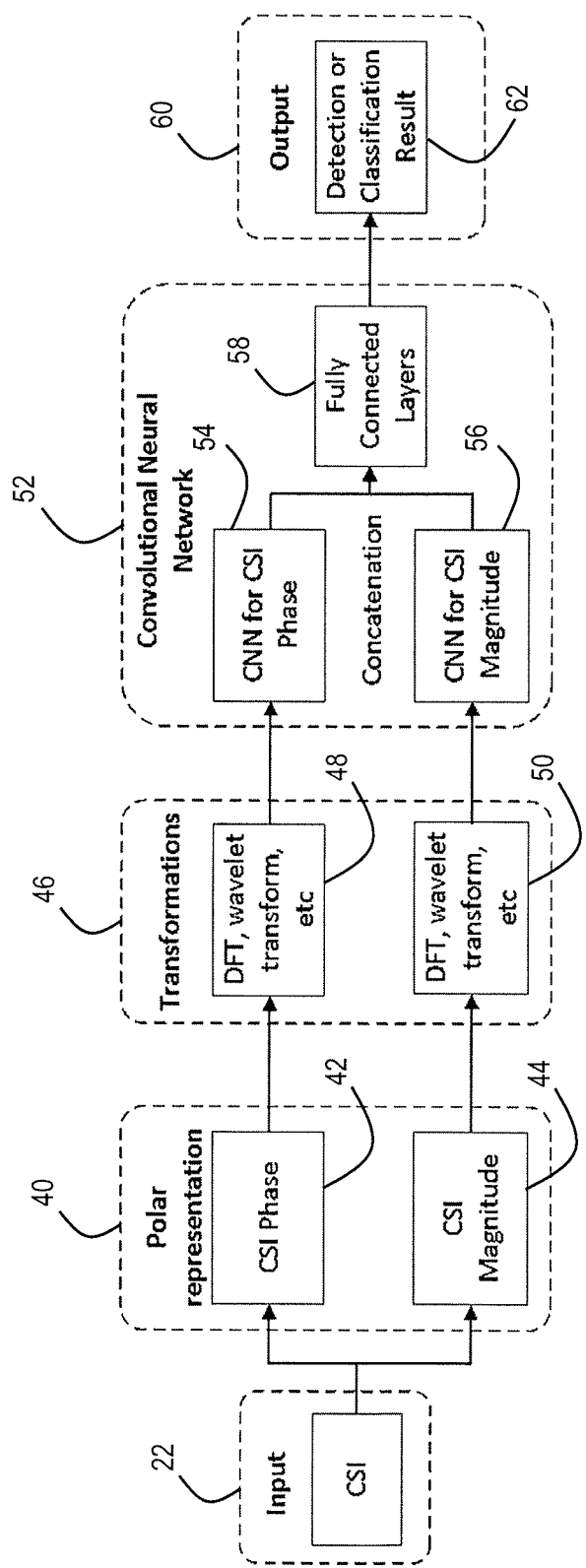
Figure 5:
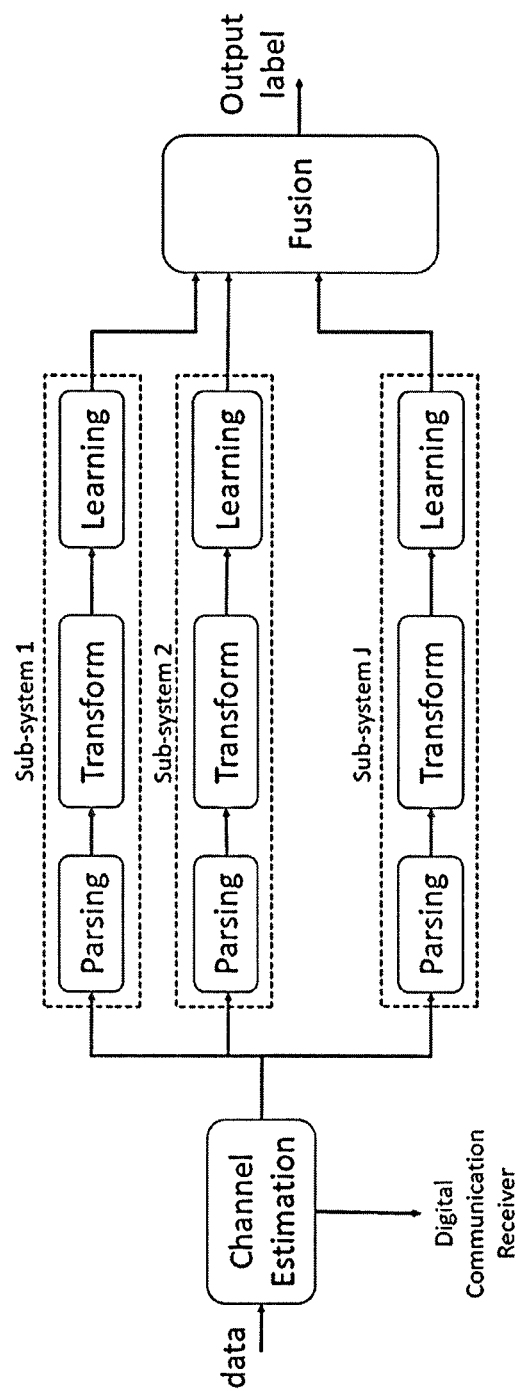
Figure 6:
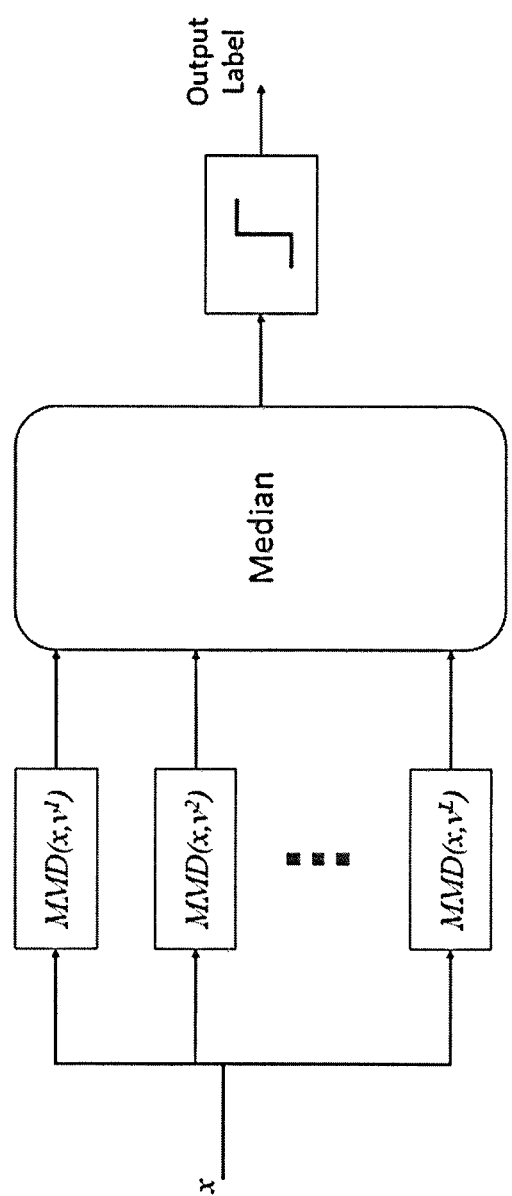

FIG. 4 is a schematic of a convolutional neural network implementation for a wideband MIMO system where the phase and magnitude of the CSI data cube is explicitly extracted from the estimated CSI and then passed through respective transformations to localize the features before feeding into two independent CNN, with the outputs of the two CNN fed into fully connected layers before the final output layer for either detection or multi-class classification;

FIG. 5 is a schematic of the learning system which may comprise multiple learning sub-systems depending on the tasks as well as the availability of training data and where the different learning systems may be of completely different learning approaches;

FIG. 6 is a schematic of the learning system which utilizes maximum mean discrepancy (MMD) as the distance metric to achieve detection where the pairwise MMD between the incoming CSI sequence and CSI sequences stored in profile are calculated and whose median is used to determine the output label.

Figure 7:
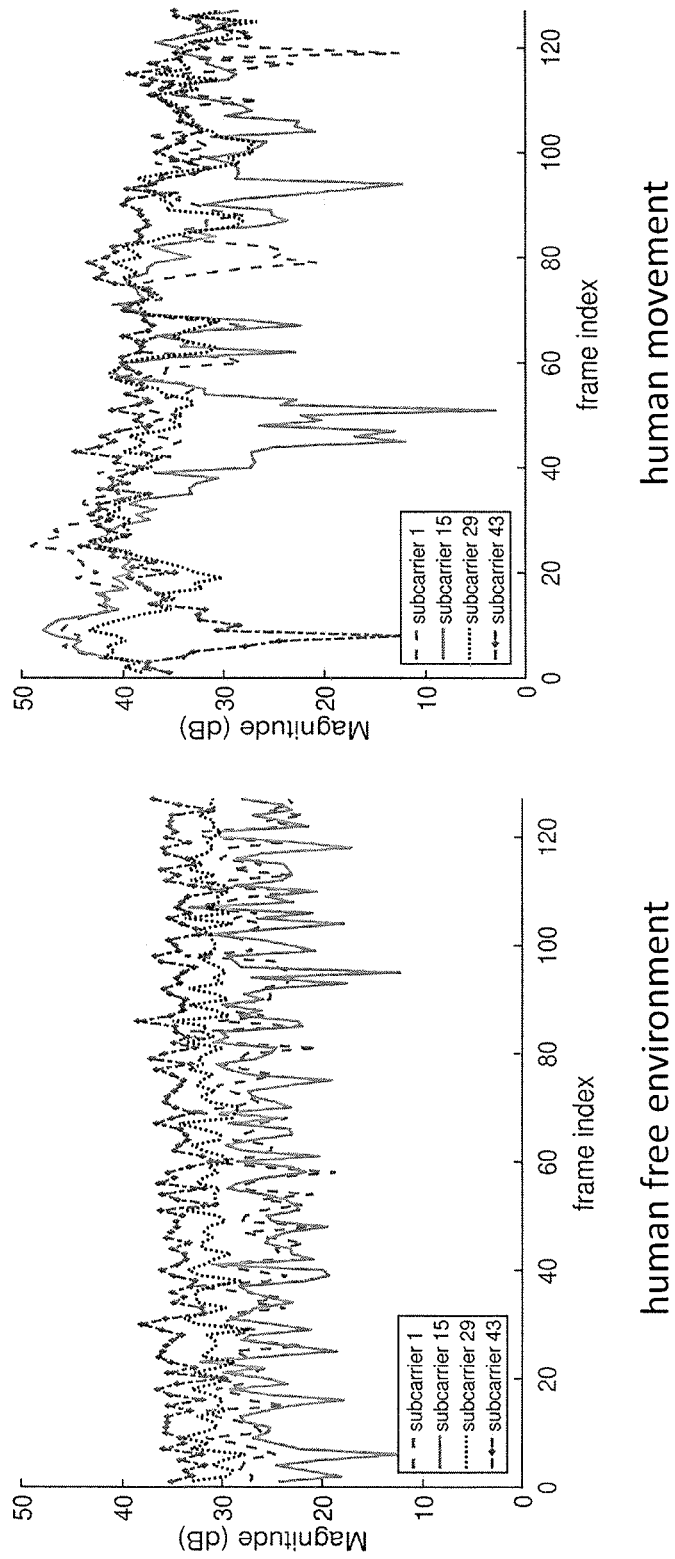
Figure 8:
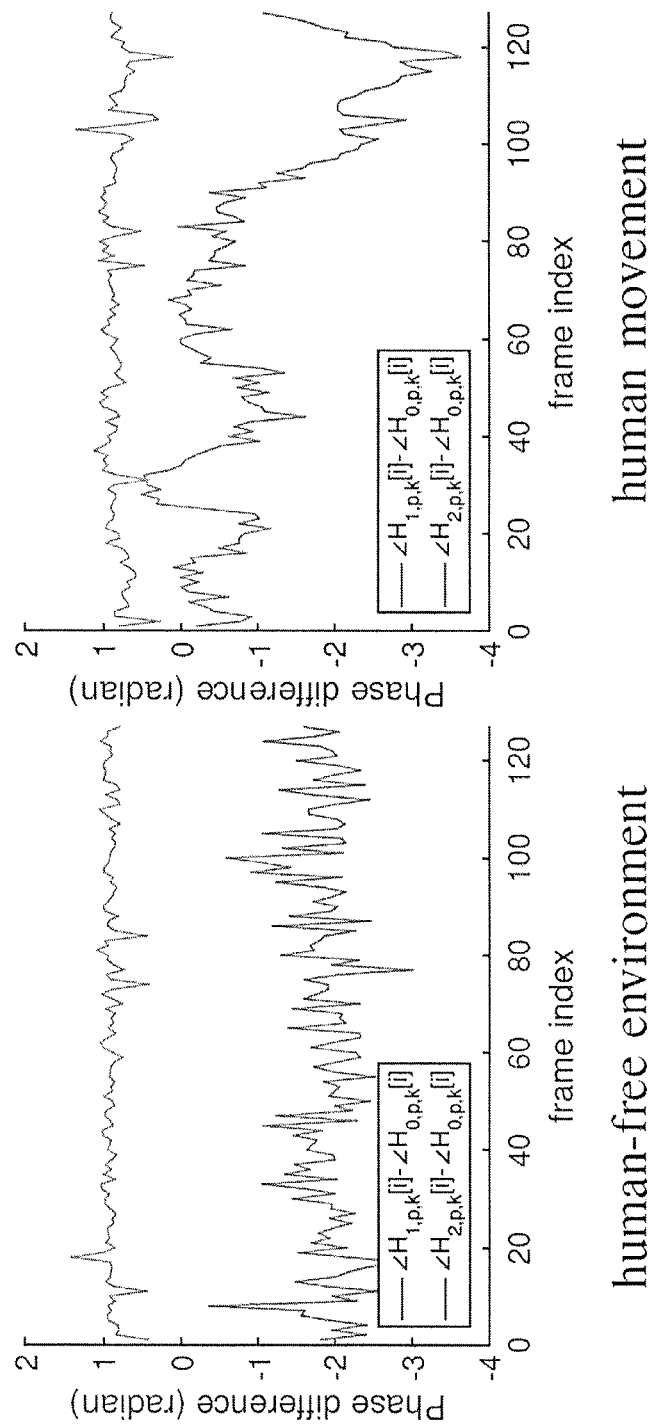
Figure 9:
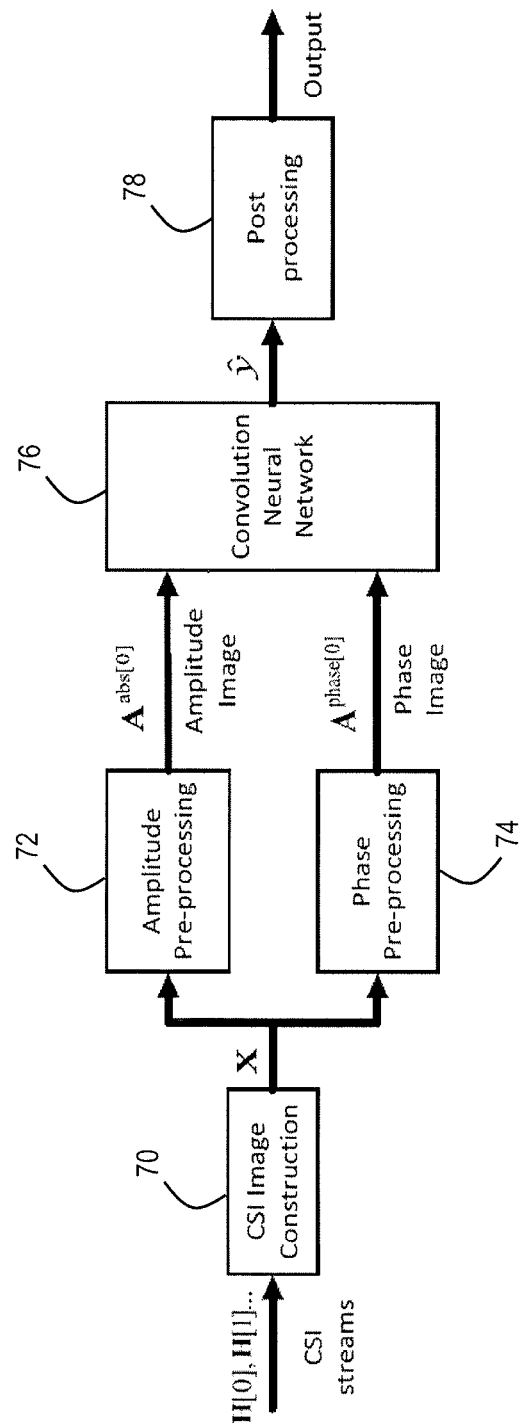
Figure 10:
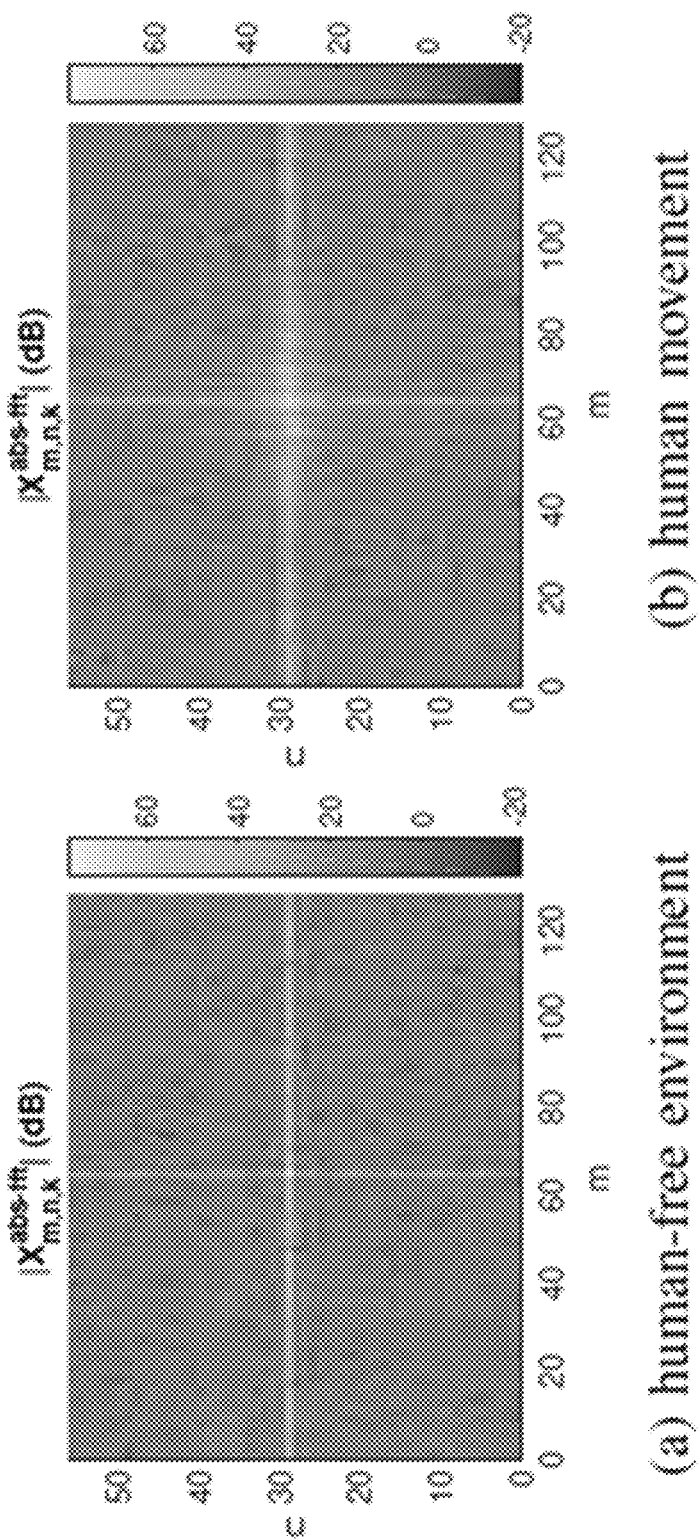
Figure 11:
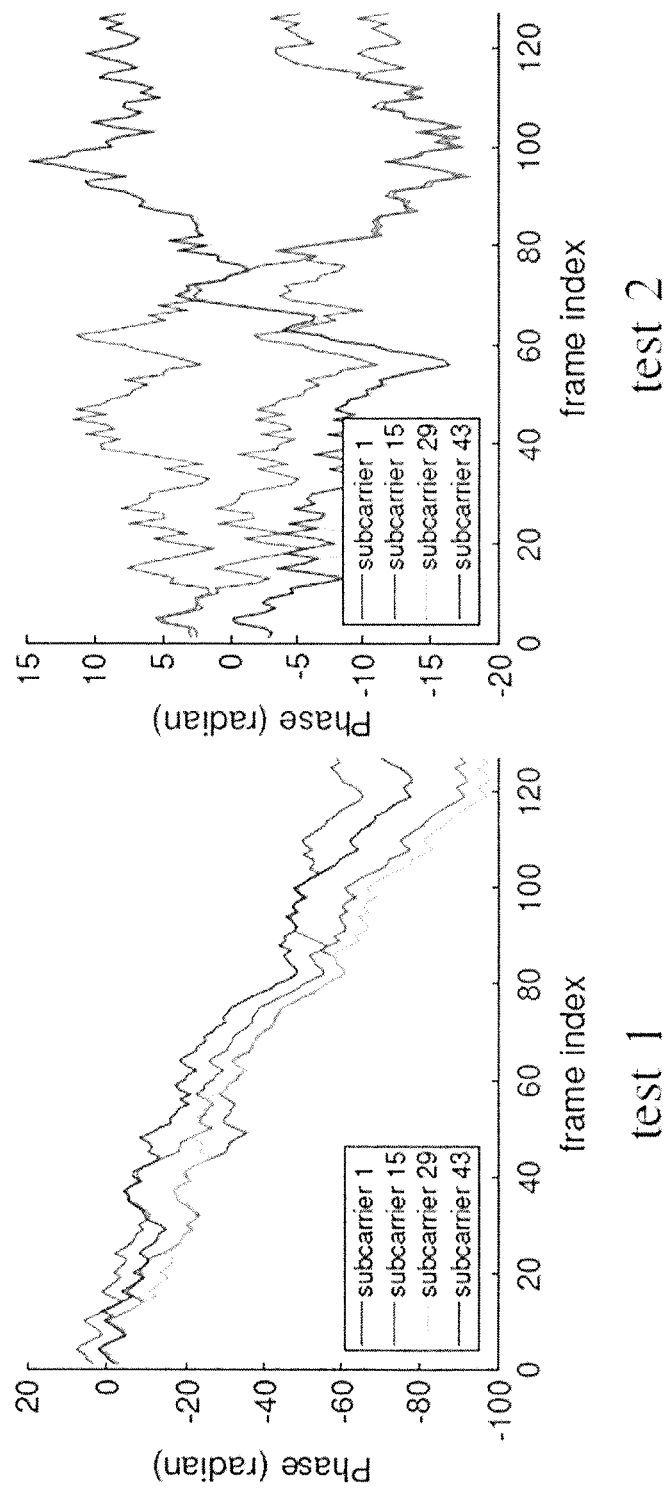
Figure 12:
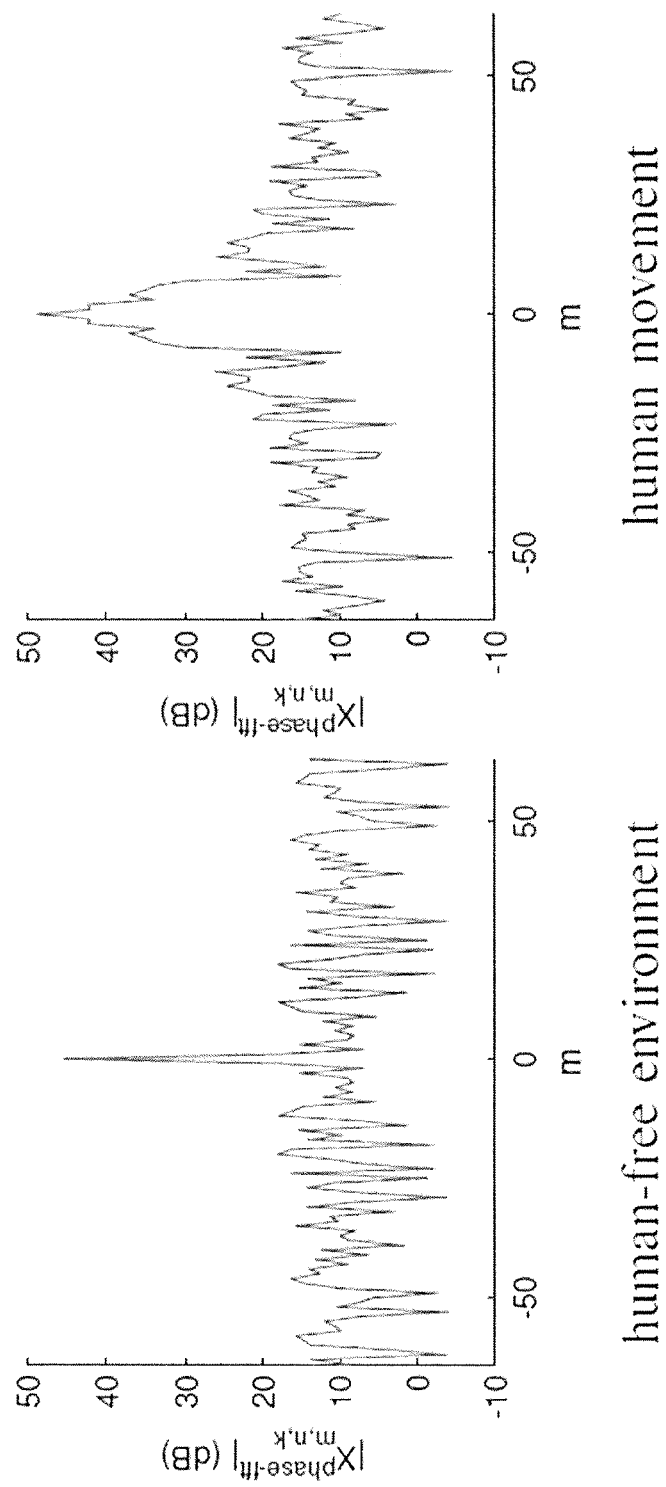
Figure 13:
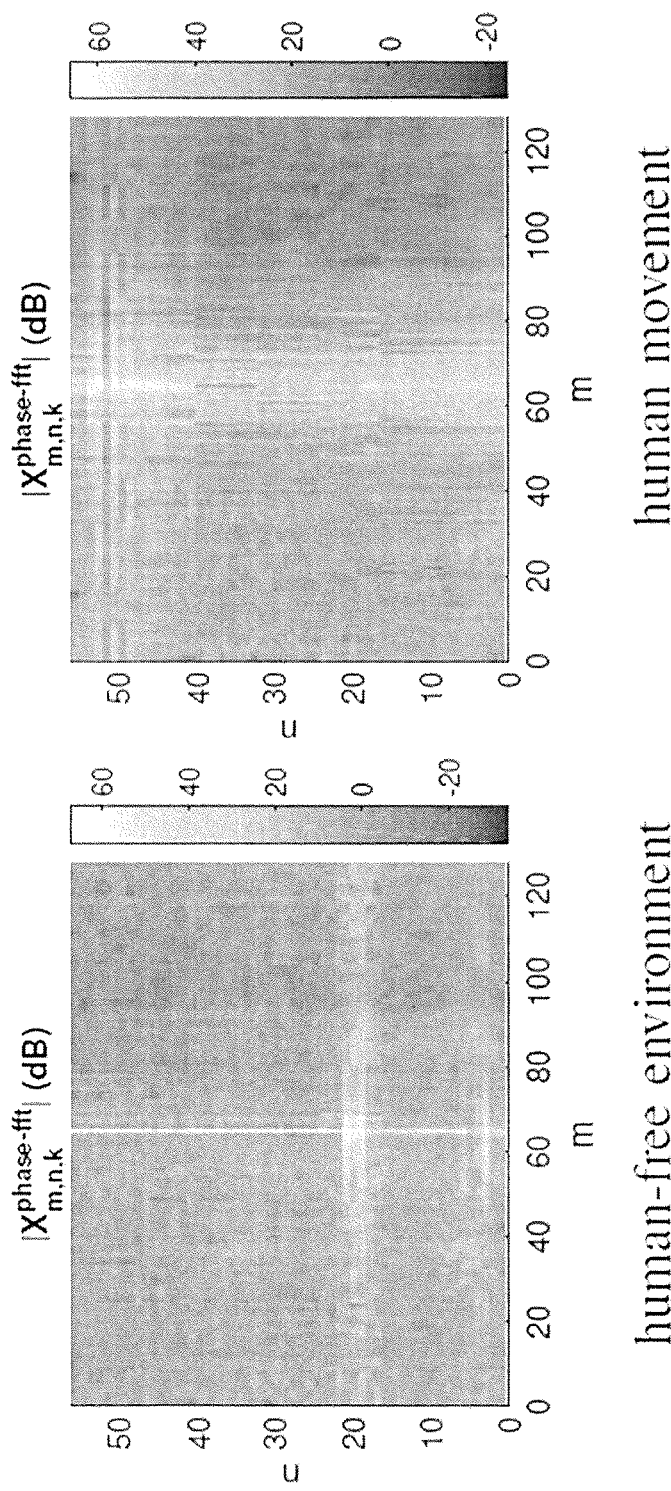

FIG. 7 is a graph of the variation of CSI amplitude over time for human free and human environments;

FIG. 8 is a graph of the variation of CSI phase difference over time for human free and human environments;

FIG. 9 is a flowgraph of a system for performing motion detection and classification using ambient radio frequency (RF) wireless signals according to the present invention;

FIG. 10 is a series of graphs of the 2D FFT of CSI amplitude along time and frequency axes for human free and human environments;

FIG. 11 is a series of graphs of phase variation in a human-free environment for a first test and a second test;

FIG. 12 is a series of graphs of the FFT of CSI phase difference along time at a fixed subcarrier for human free and human environments;

FIG. 13 is a series of graphs of the FFT of CSI phase difference along time at all subcarriers for human free and human environments.

Figure 14:
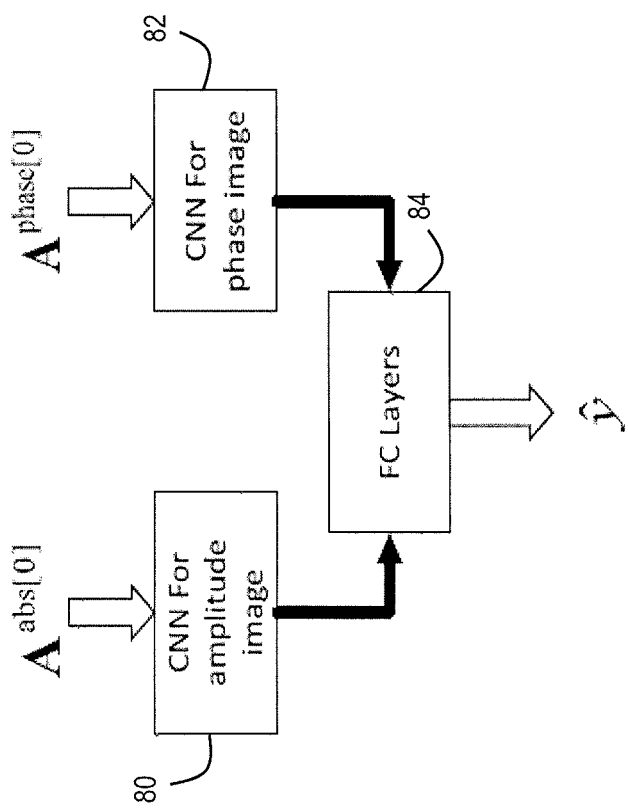
Figure 15:
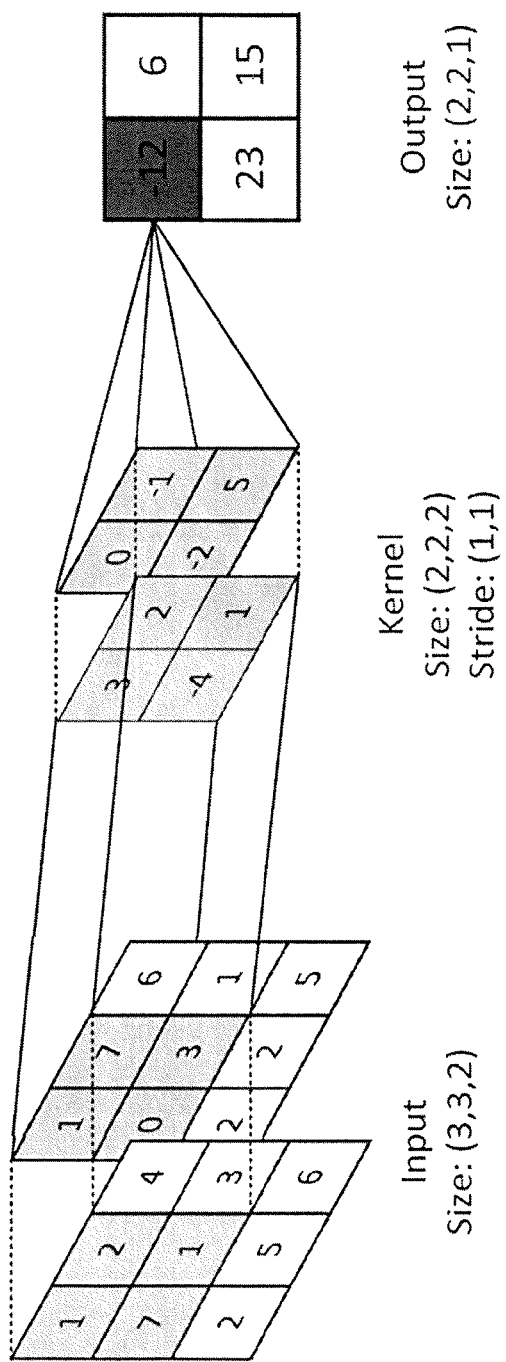
Figure 16:
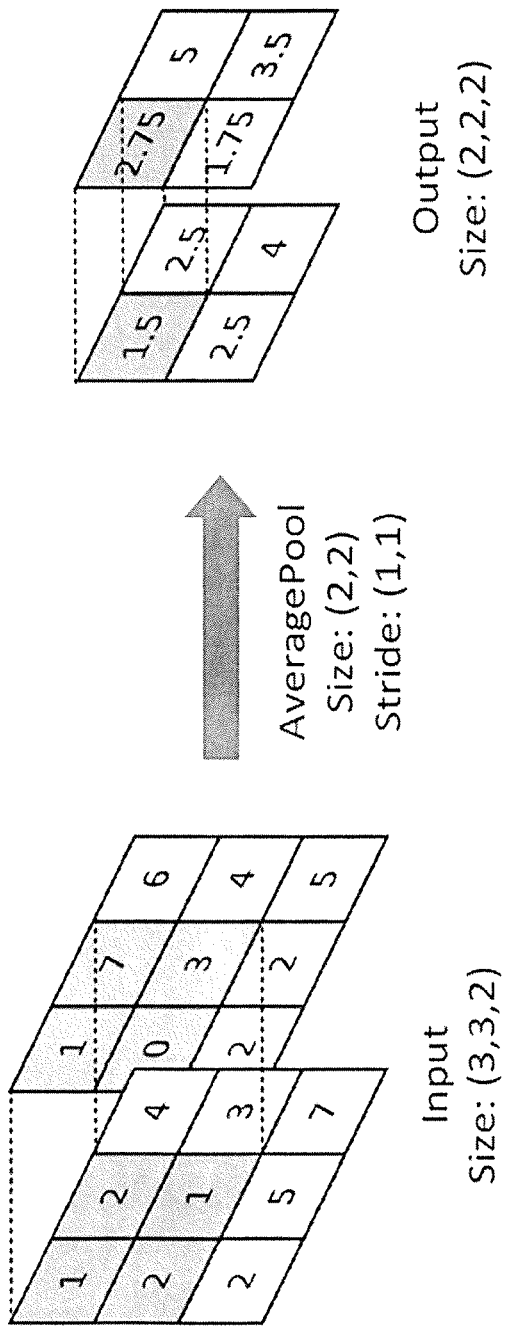
Figure 17:
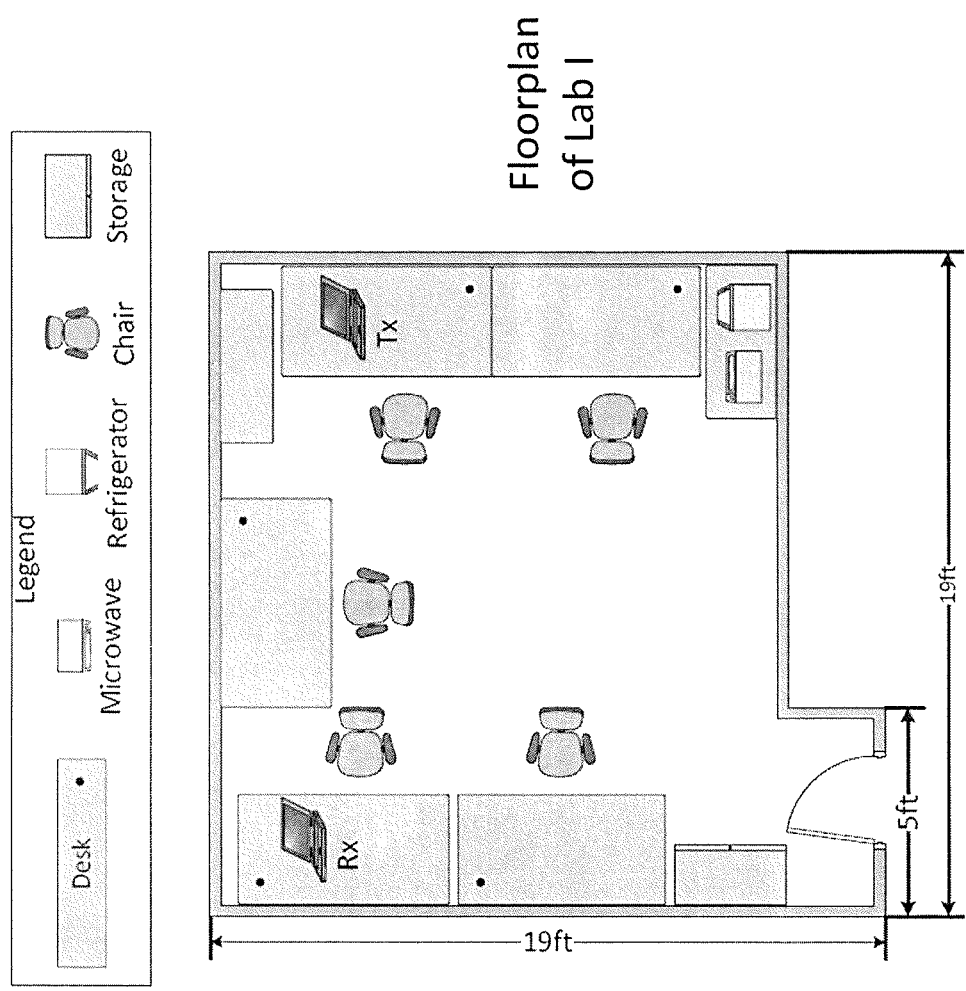
Figure 18:
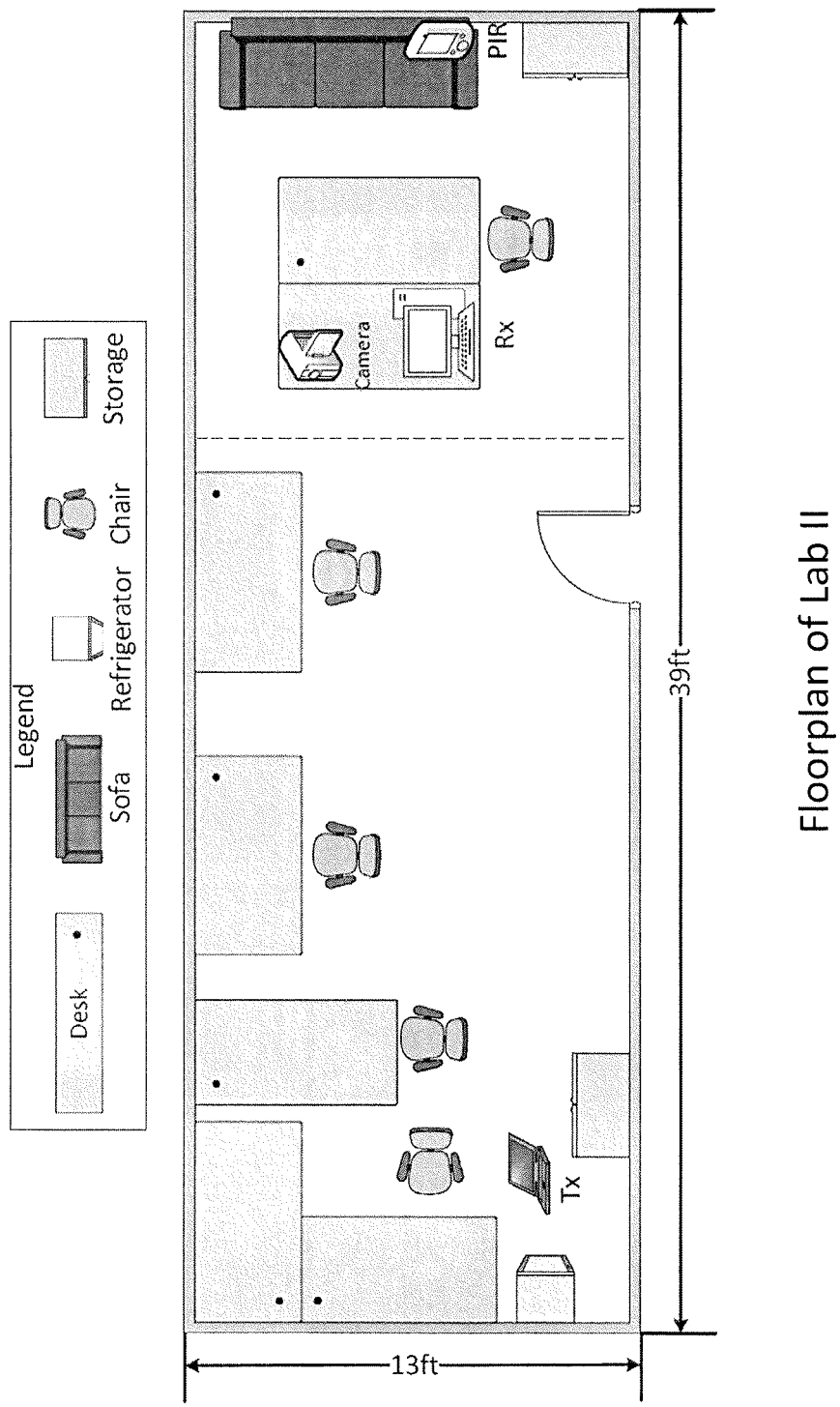
Figure 19:
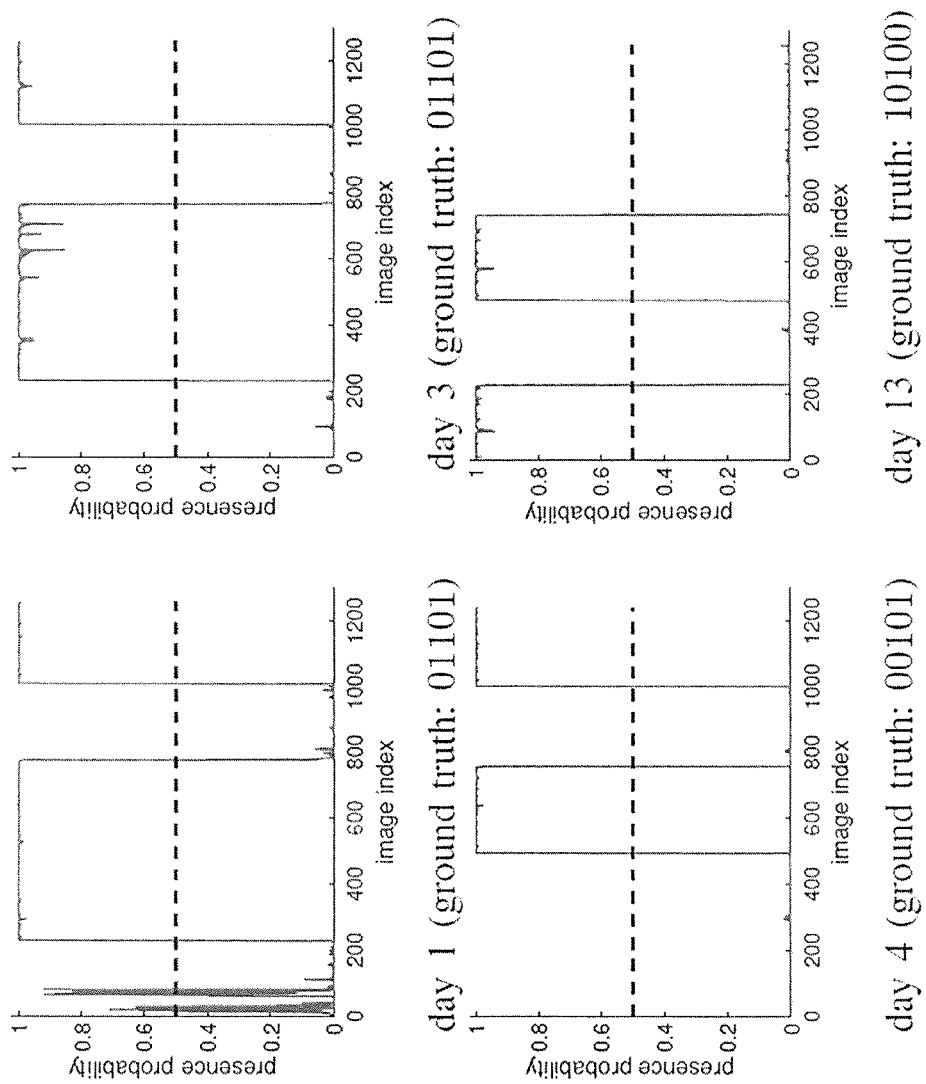
Figure 20:
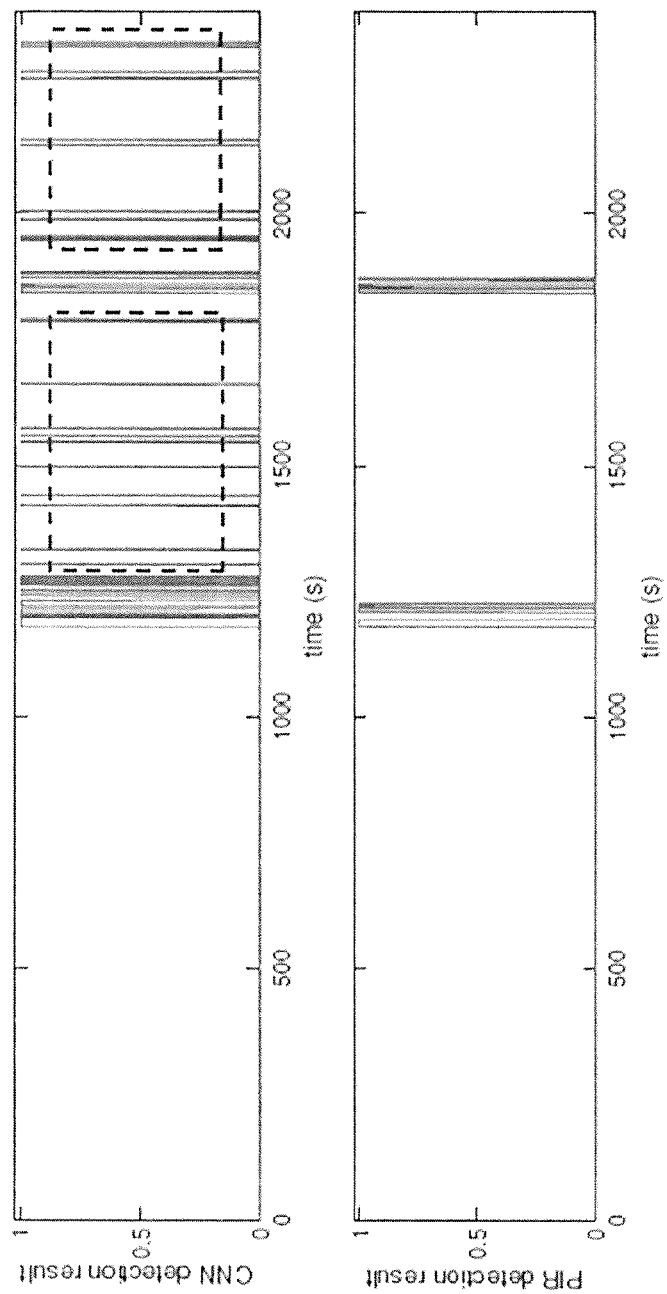
Figure 21:
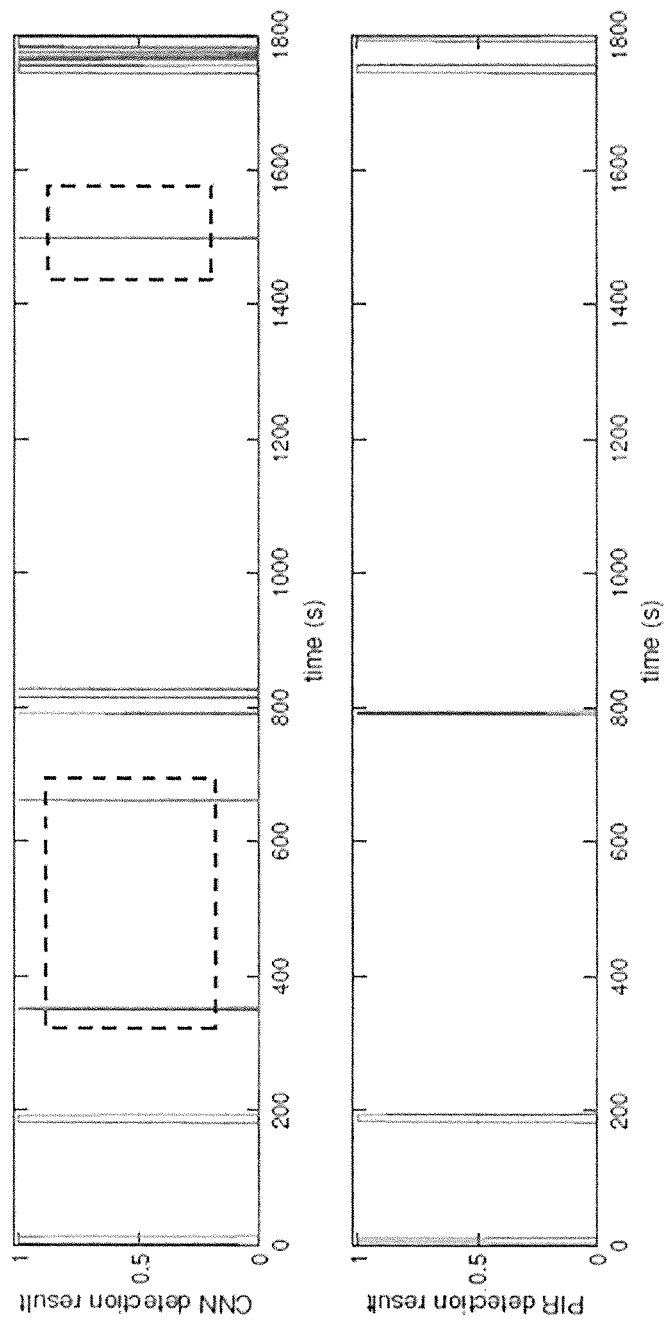
Figure 22:
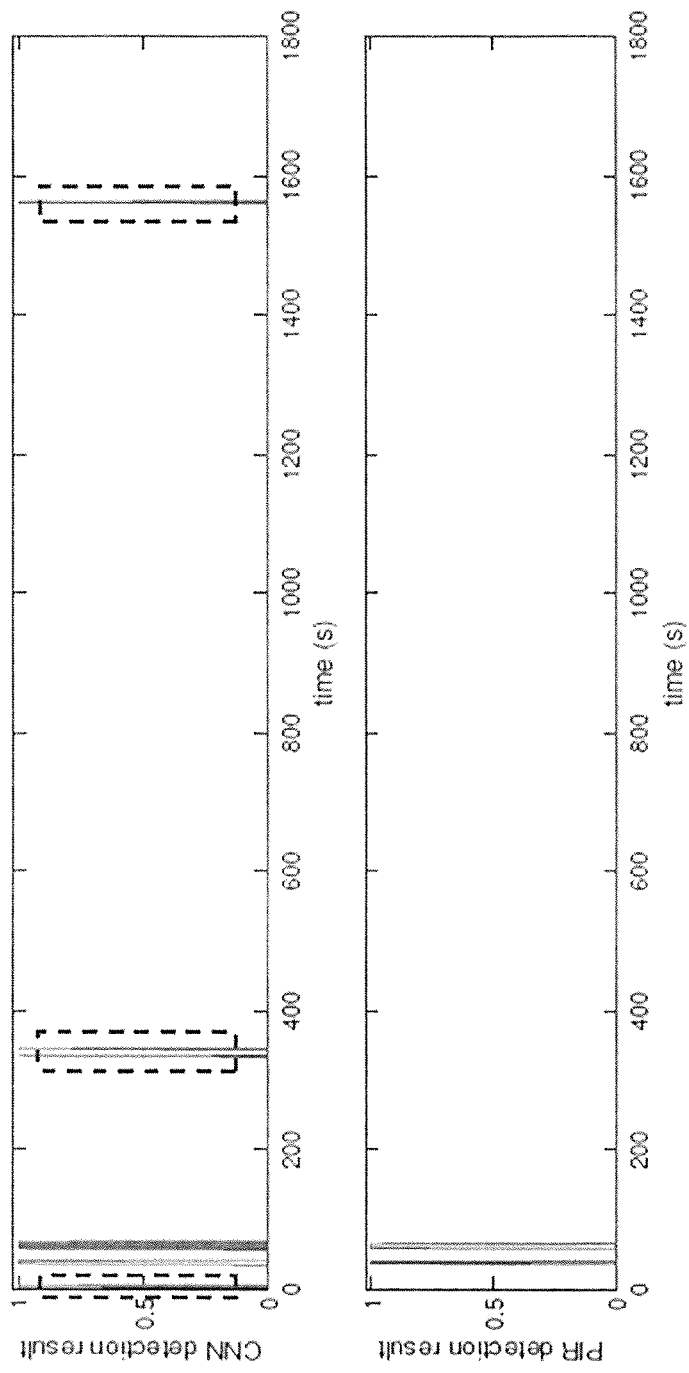
Figure 23:
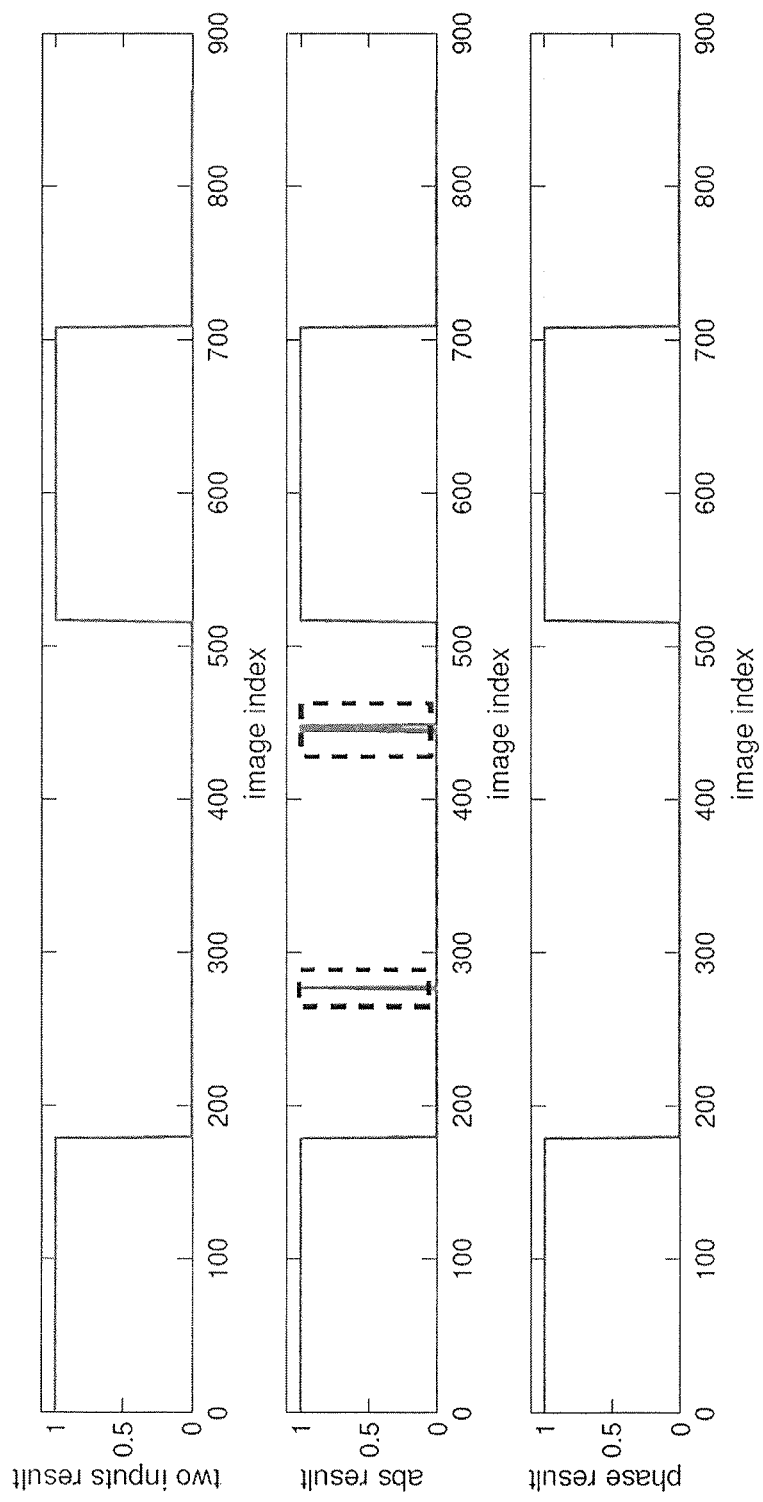
Figure 24:
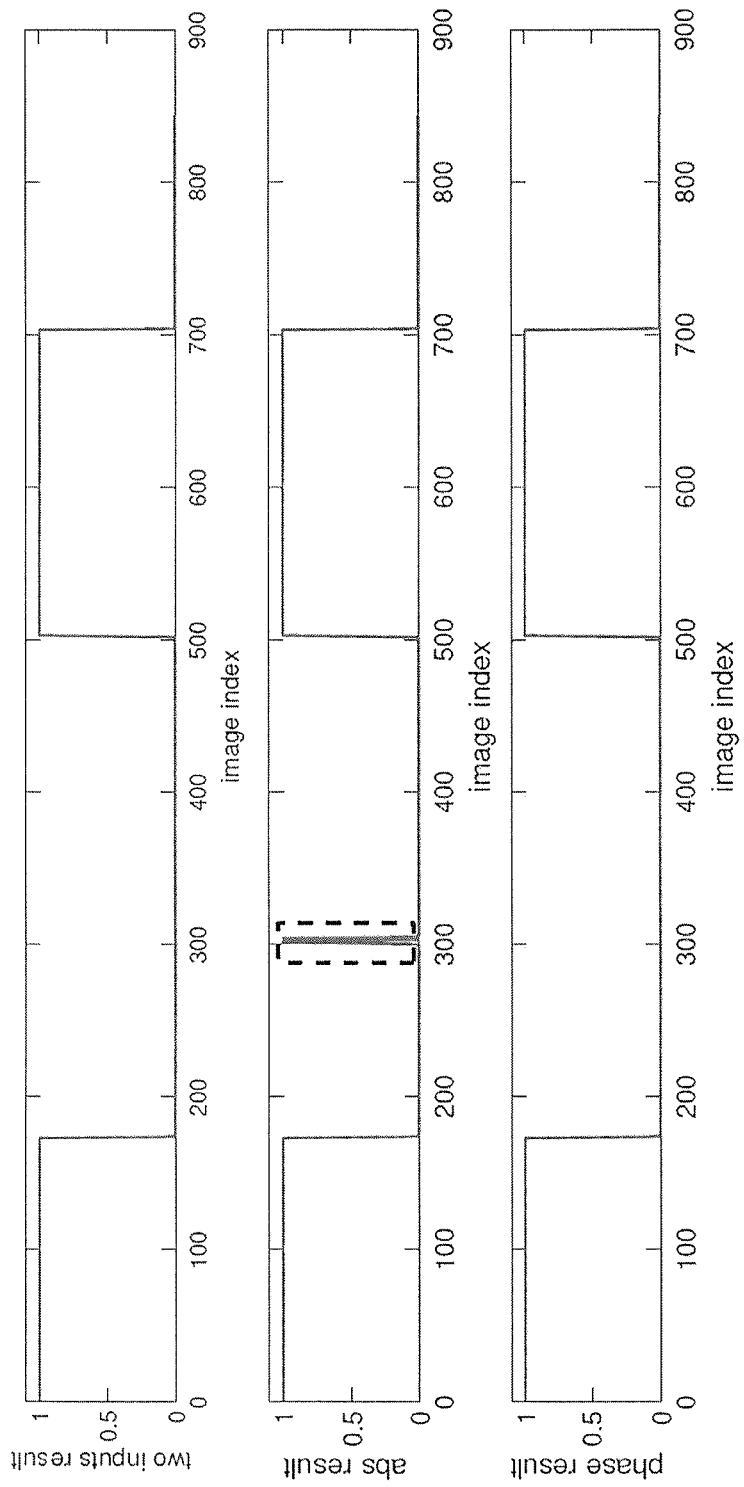

FIG. 14 is a diagram of the architecture of a CNN for use with the present invention;

FIG. 15 is a diagraph of an example of convolution layers of a CNN for use with the present invention;

FIG. 16 is a diagraph of an example of average pooling layers of a CNN for use with the present invention;

FIG. 17 is a diagram of a first indoor environment used in an example of the present invention;

FIG. 18 is a diagram of a second indoor environment used in an example of the present invention;

FIG. 19 is a series of graphs of a mixture run detection result;

FIG. 20 is a graph of a presence detection result in a first test;

FIG. 21 is a graph of a presence detection result in a second test;

FIG. 22 is a graph of a presence detection result in a third test;

FIG. 23 is a graph of one mixture run on day 9 of a test;

FIG. 24 is a graph of one mixture run on day 11 of a test; and

Figure 25:
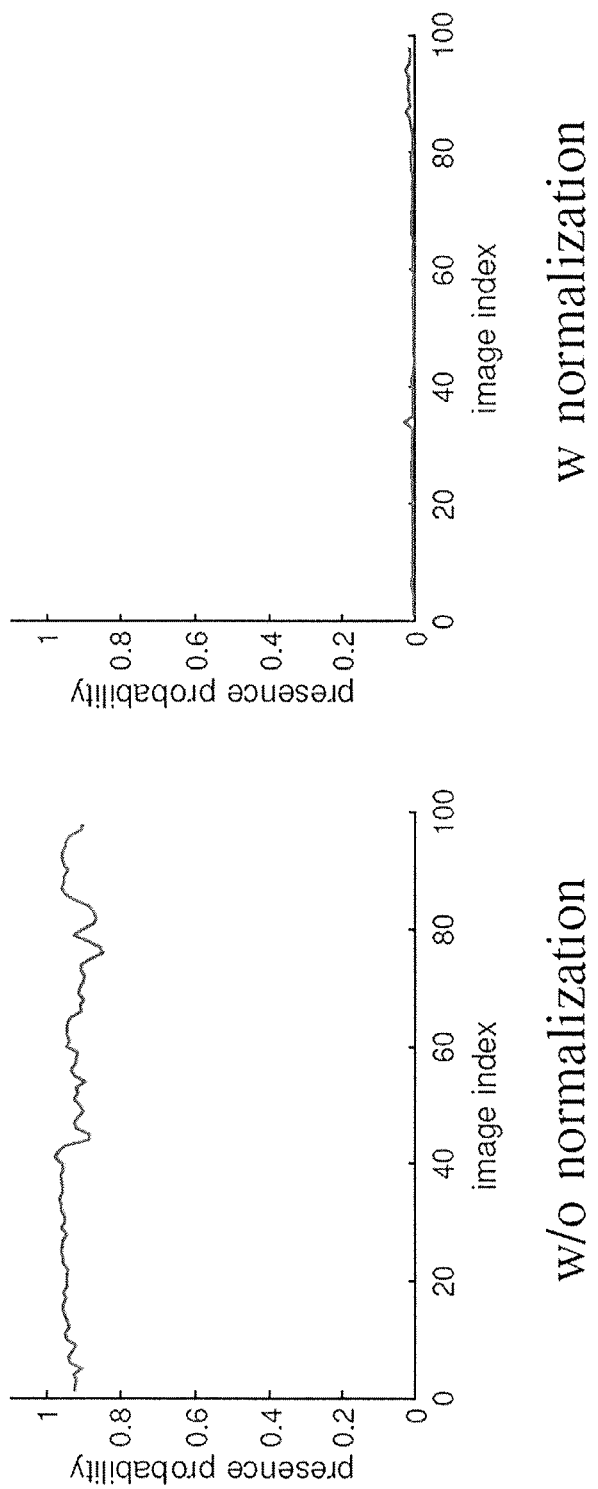

FIG. 25 is a series of graphs of exemplary collected CSI images without normalization and with normalization.

DETAILED DESCRIPTION OF THE INVENTION

Figure 1:
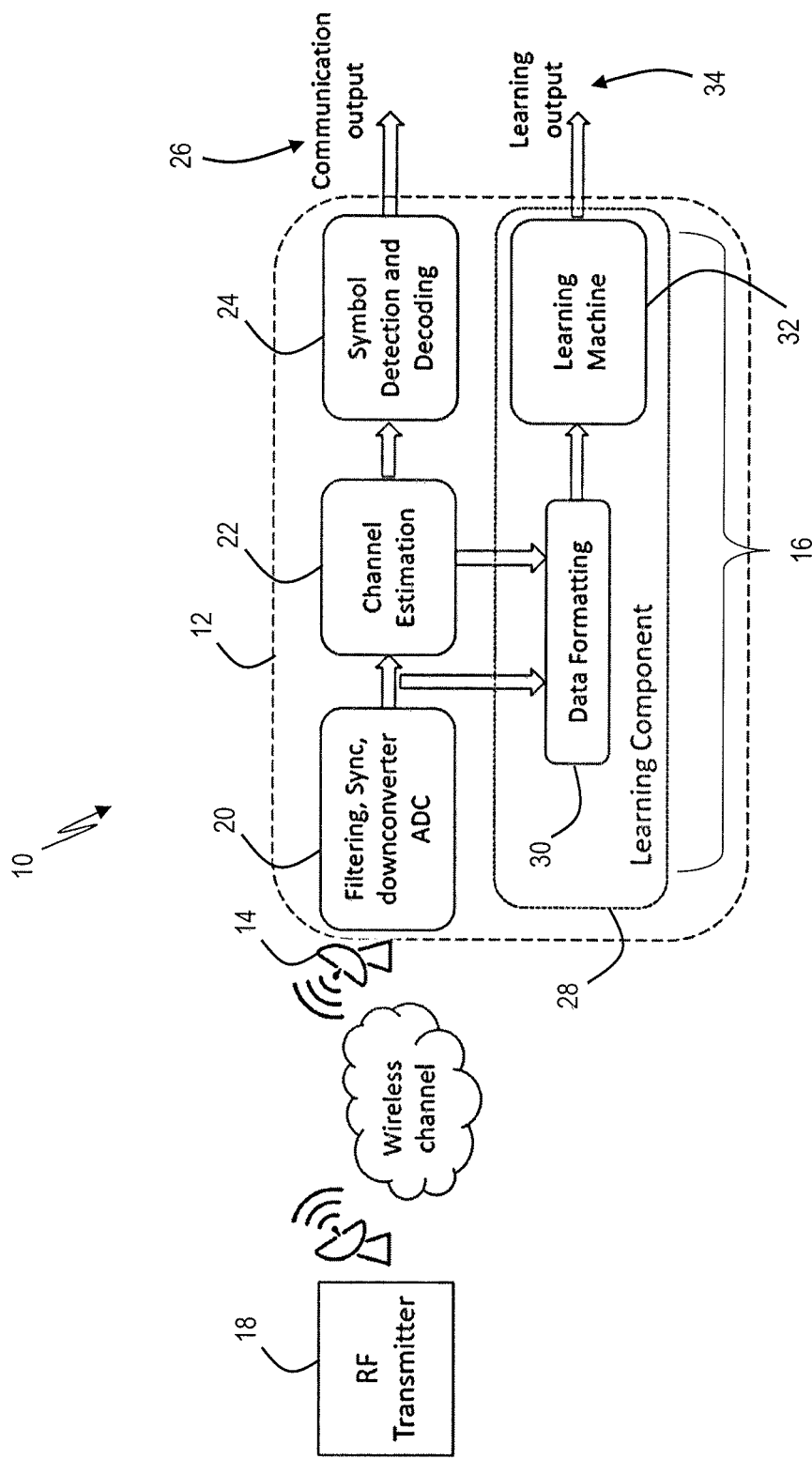
FIG. 1 is a high level schematic of the RF learning system where the RF receiver conducts normal functions for digital communications and relevant information, including the estimated CSI, is passed onto the learning component for any desired learning task, e.g., motion detection and classification.

Referring to the figures, wherein like numeral refer to like parts throughout, there is seen in FIG. 1 a system 10 for performing motion detection and classification using ambient radio frequency (RF) wireless signals. System 10 comprises a receiver 12 having an antenna 14 for receiving wireless signals in a predetermined wireless channel that are sent from a RF transmitter 18. Receiver 12 is associated with a programmable device 16, such as a microprocessor, microcontroller, central processing unit or comparable hardware, firmware, software and combinations thereof, that is programmed to perform analog-to-digital conversion 20, including any necessarily filtering, sync, and down conversion on the wireless signals received by receiver 12. Programmable device 16 is further programmed to process the converted wireless signals to perform channel estimation 22 and symbol detection and decoding 24 to provide a communication output 26. The converted wireless signals are also processed by a machine leaning component 28 that performs data formatting 30 with input from symbol detection and decoding 24 and then a learning machine 32 that provides a learning output 34.

Figure 2:
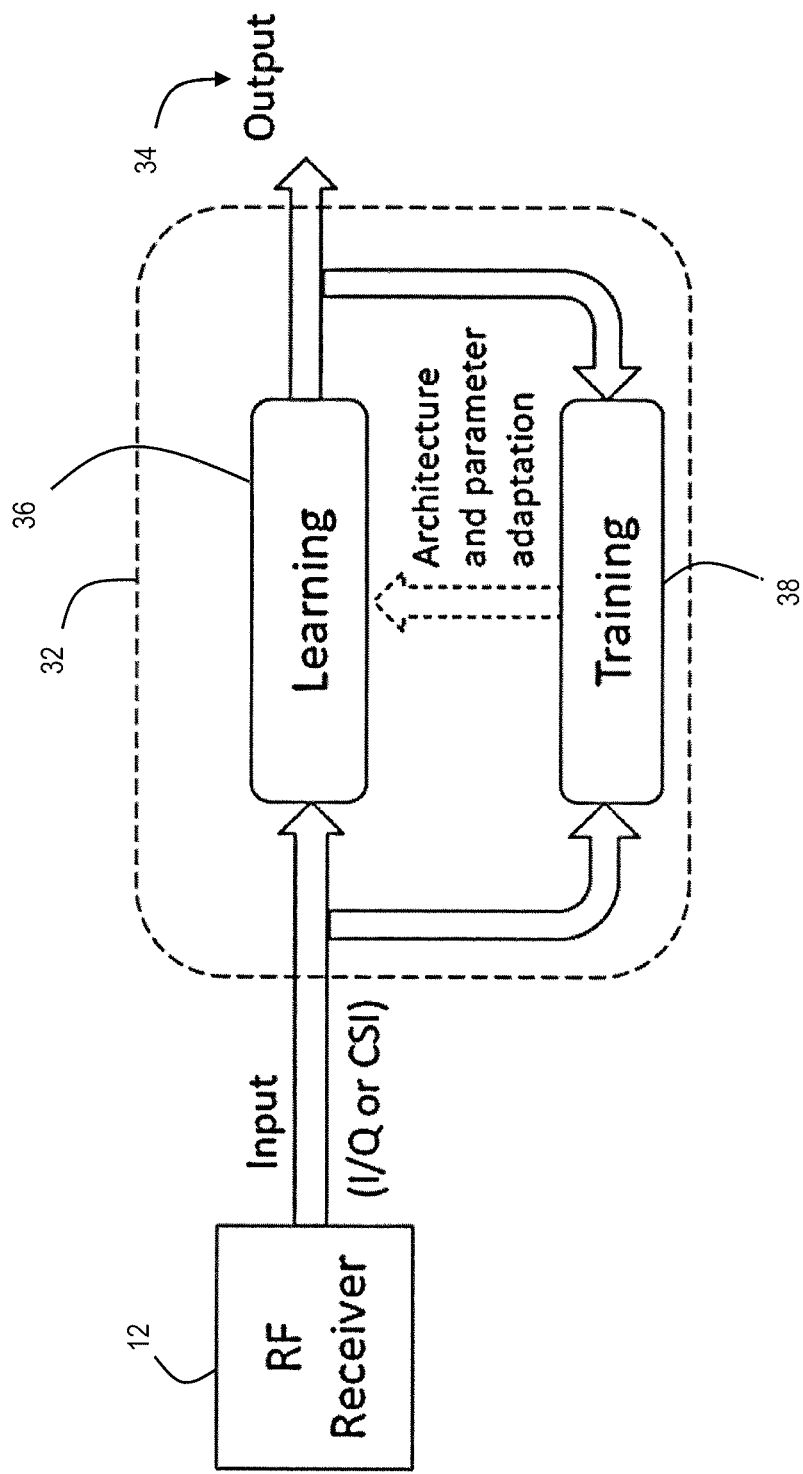
FIG. 2 is a schematic that illustrates a dynamic learning system where training and learning are accomplished in a continuous manner where learning output is periodically fed back to the training component.

As seen in FIG. 2, leaning machine 32 includes a machine learning module 36 and training feedback 38 to produce output 34, which comprises the detection of any motion. In the most general case, a wideband multi-antenna communication system has a transmitted signal x(t,k) from the transmit antenna array at time t, subcarrier k, resulting in the corresponding received signal y(t,k) at time t, subcarrier k at the receive antenna array:

$$y(t,k)=H(t,k)x(t,k)+z(t,k) \quad (1)$$

where H(t,k) is the channel matrix at time t and subcarrier k between the transmit and receive antenna arrays as follows:

$$H(t,k) = \begin{bmatrix} h(t,k,1,1) & h(t,k,1,2) & \ldots & h(t,k,1,N_t) \\ h(t,k,2,1) & h(t,k,2,2) & \ldots & h(t,k,2,N_t) \\ \vdots & \vdots & \ddots & \vdots \\ h(t,k,N_r,1) & h(t,k,N_r,2) & \ldots & h(t,k,N_r,N_t) \end{bmatrix} \quad (2)$$

where $N_t$ is the number of transmit antennas and $N_r$ is the number of receive antennas, and z(t,k) is the receive noise vector at time t and subcarrier k. The propagation delay between the transmitter and the receiver has been neglected to simplify the notation.

Figure 3:
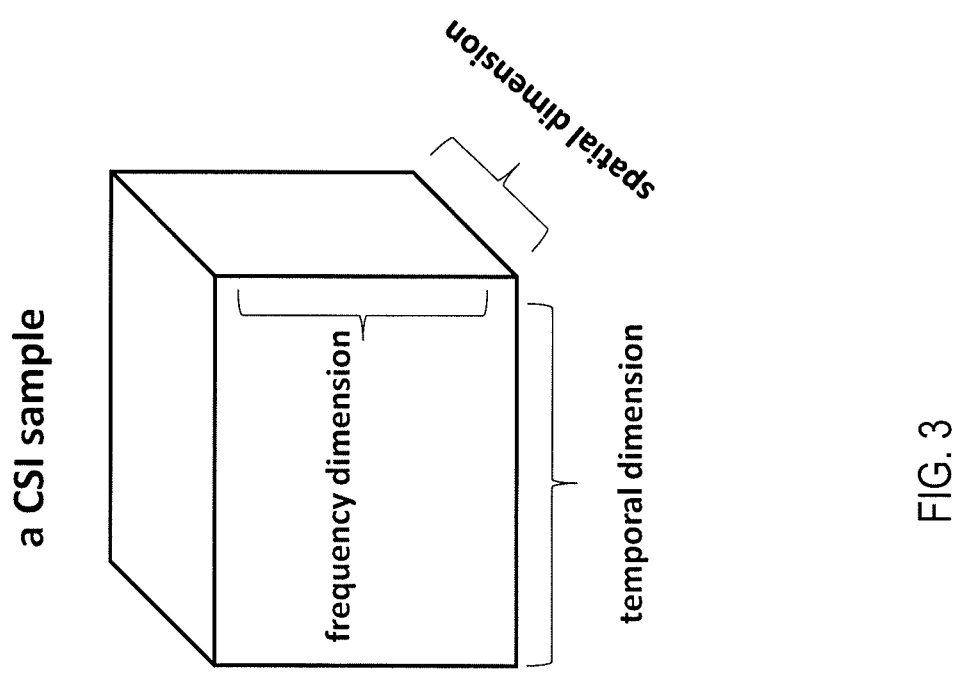
FIG. 3 is an illustration of CSI data cube in a wideband MIMO system where temporal, spatial, and frequency dimensions constitute the three axes of each CSI sample for the learning machine.

The primary step at the receiver is to construct an estimate of the channel state information. Thus for every time instance t and subcarrier k, there is an estimated channel matrix, $\hat{H}(t,k)$, each one is of dimension $N_r \times N_t$. In the most general case, the estimated $\hat{H}$ is a four dimensional array, with indices for time, subcarrier, receiver antenna, transmit antenna. For some learning systems, one would flatten the spatial dimension, i.e., combine the last two dimensions such that $\hat{H}$ becomes a three dimensional array with indices for time, subcarrier, and spatial dimension as shown in FIG. 3.

Referring to FIG. 4, the CSI array 22 is the input to machine leaning component 28 that performs the motion detection/classification task. It is important to note that the CSI array contains values that correspond to the channel coefficients in its complex baseband representation. Thus, they are in general complex valued. An alternative expression of the complex valued channel coefficients is to use phase and magnitude, i.e., to convert channel coefficients into polar form.

The characteristics of the CSI array in the three dimensions (temporal, frequency, and spatial) are largely dependent on the channel environment. For example, for a wideband system in which the difference in delay from different paths exceeds the duration of the symbol interval, the channel will exhibit frequency variation (i.e., the so-called frequency selective fading channels). For the spatial dimension, the channel coefficients between different transmitter and receiver antenna pairs are different in a scattering environment or when the antenna aperture is large in a line-of-sight dominated channel. Therefore, for a wideband system in a typical indoor environment, channel coefficients vary in both frequency and spatial dimensions.

The temporal dimension however is the most critical one for motion detection. In a static environment, i.e., an environment absent of moving objects, the CSI are ideally constant in time, i.e., the CSI remain the same along the temporal dimension. With movement in the environment, the manner in which multiple channel paths add up together will vary in time, leading to CSI variation in time. Therefore, the estimated CSI suitably processed across time can reveal the movement information in the environment.

With the estimated CSI array, various machine learning algorithms are employed which require pre-processing/organizing the CSI array in a manner that meets the requirements of the corresponding learning algorithms. One such approach is supervised learning using deep neural networks. In such a system, past CSI measurements of both static and movement channel environment are used to train a neural network and the trained neural network is then used to classify the measurement CSI accordingly. Training needs to be persistent as the environment is almost always evolving as seen in FIG. 2.

Consider, for example, the use of convolutional neural networks (CNN). CNN is extremely powerful in learning features in two or high dimensional array, hence is particularly useful in tasks such as image recognition and object detection. A particular CNN architecture for motion detection/classification is illustrated in FIG. 4. First, polar representation 40 of the CSI is used. Thus, the CSI array is split into two separate arrays of identical dimensions, one corresponds to CIS phase array 42 while the other CSI magnitude array 44. To extract phase information, unwrapping is implemented to remove any artificial discontinuity along the temporal domain. For both the phase and magnitude arrays, transformation 46 includes DFT, wavelet transforms, etc. 48 and 50 allow the temporal and frequency domains to be used to construct images, while different transceiver pairs serve as different layers in CNN 52 as independent CNNs 54 and 56, much in the same way RGB layers are used in image recognition using CNN. Two independent CNNs 54 and 56 are connected through fully connected deep neural network layer 58 which eventually lead to the output layer 60 indicating the classification result 62.

The reason the three dimensional data cube is organized in the above manner, i.e., temporal and frequency constitute the image dimensions while spatial dimension corresponds to the CNN layer, is as follows. With motion present in the RF channel, the effect on CSI temporal and frequency domain can often be quantified by the separation in time and frequency (e.g., the correlation function in time and frequency). Such structured information is best preserved through CNN's convolution operation. On the other hand, spatial dimension primarily provides redundancy in MIMO system and antenna indices do not directly correlate to the way CSI may relate to each other between different transceiver pairs. Alternatively, in a narrowband system where no subcarrier dimension is available for the CSI array, one can have a simplified CNN architecture where temporal and spatial dimensions are used to form an image while the real and imaginary components form two layers of the CNN.

A CNN typically starts with detecting local features, i.e., the first CNN layer detect features that are constrained by the filter size. It is therefore desirable to 'localize' global features in CSI array. For example, the multipath channel with certain power delay profile will introduce a certain frequency correlation. Conversely, different Doppler spread due to difference in arrival angles (i.e., the Clarke-Gans model) leads to a particular correlation in time of the CSI. These correlation structures, both in temporal and frequency domains, are global in nature. Thus, to facilitate extraction of such features when CNN is used, localizing those features through transformations are particularly helpful. For example, two-dimensional discrete Fourier transform can be used where slow changes in time are reflected in large low-frequency components while fast changes in time are reflected in large high-frequency components. Other transforms, such as certain wavelet transforms can also be used to localize such global correlation features in temporal and frequency dimensions. This is illustrated in FIG. 4 with an example implementation of CNN.

Alternative learning approaches can also be used for motion detection and classification based on the CSI array. For example, in applications where only static measurements are available or that it is simply impossible to have collected enough movement data that are representative of all possible movement, one can implement learning algorithms that use some distance metrics between the obtained samples and the static measurements. One such candidate is given in FIG. 6 which exploits the so-called maximum mean discrepancy (MMD) which takes advantage of the computational advantages of kernel based learning approach. Specifically, for two sequences of vectors, say, $x=[x_1, \ldots, x_n]$ and $v=[v_1, \ldots, v_m]$, the MMD can be computed as $$MMD(x, v) = \frac{1}{n(n-1)} \sum_{i=1}^{n} \sum_{j \neq i} k(x_i, x_j) + \frac{1}{m(m-1)} \sum_{i=1}^{m} \sum_{j \neq i} k(v_i, v_j) - \frac{2}{mn} \sum_{i=1}^{n} \sum_{j=1}^{m} k(x_i, v_j) \quad (3)$$

where $k(x,y)$ is the so-called kernel function. Assume now $v^1, \ldots, v^L$ are measurement sequences corresponding to static environment collected, for example, at different times; x is a test sequence whose state (static or with motion) needs to be determined, one can then compute pairwise MMD between x and all the sequences $v^1, \ldots, v^L$ and then compare, say, the median of the computed MMDs to a threshold. The selection of the type of kernel $k(x,y)$, the summary statistic using the computed MMD (e.g., median versus average), and the test threshold can be determined off-line with training data.

At each receiver where motion detection/classification is carried out, the learning system may consist of different learning sub-systems as illustrated in FIG. 5, each with different learning algorithms (e.g., CNN based supervised learning, threshold test using MMD or other statistics). The learning outputs are then aggregated and processed to give the final learning outcome (e.g., a label associated with the input data) for the particular receiver. When multiple receivers are involved, decision fusion can be done when the output of all sub-systems or the final learning outcomes can be collectively processed for the final output.

In a MIMO-OFDM system with $N_t$ transmit antennas and $N_r$ receive antennas, the MIMO-OFDM system has $N_{sc}$ subcarriers and each physical layer frame consists of M OFDM symbol blocks, where $d^p[m,i]$ can denote the m-th frequency domain OFDM symbol vector in the i-th frame sent by the p-th transmit antenna, $d_k^p[m,i]$ can denote the symbol to be sent on the k-th subcarrier for $k=0, \ldots, N_{sc}-1$, and the FFT operator can be denoted by F. In the time domain, the discrete-time complex baseband signal corresponding to $d^p[m,i]$ is given by:

$$s^p[m,i] = F^{-1}(d^p[m,i]) \quad (4)$$

Assume that the wireless channel is stationary within one physical layer frame. In frequency domain, the complex baseband signal captured at the q-th receive antenna corresponding to $s^p[m,i]$, for $p=0, \ldots, N_t-1$ satisfies $$y_k^q[m, i] = \sum_{p=0}^{N_t-1} H_{q,p,k}[i] d_k^p[m, i] + v_k^q[m, i] \quad (5)$$

where $k=0, \ldots, N_{sc}-1$, $H_{q,p,k}[i]$ is the CSI from p-th transmit antenna to q-th receive antenna on the k-th subcarrier, and $v_k^q[m,i]$ is the additive noise.

During wireless communications, due to factors such as reflection and refraction, the received signal $y^q$ contains multiple copies of the transmitted signal $s^p$. Every entry of $H[i] \in \square^{N_r \times N_t \times N_{sc}}$ the aggregated result of multiple propagation paths between each transmit and receive antenna at different subcarriers.

Referring to FIG. 7, an example of the variation of $|H_{q,p,k}[i]|$ over i with and without human movement for fixed p and q is shown. The observation is made on four evenly spaced subcarriers, and the duration of each test is roughly 1:27 s. The features induced by human motion affect the propagation between every transmit-receive antenna pair. The fact that multiple transceiver pairs (a.k.a, spatial diversity) exists in the MIMO-OFDM system can thus be explored for enhanced performance: the channel response between each transceiver pair can serve as a layer in a CNN architecture where the constructed image itself consists of temporal and frequency dimensions.

The fact that multiple antennas are present at these WiFi transceivers is also exploited in this paper so that the phase information of CSI estimate can become much more useful for presence detection. As WiFi devices (or any other MIMO transceivers) typically use a single oscillator for RF circuitry corresponding to different antennas, the CFO, if present, is common to all inputs at different receive antennas. Similarly, sampling is also driven by a single clock, hence STO is also identical for all inputs at different receive antennas. Thus, instead of using the raw phase measurement of estimated CSI, one can use phase difference between receive antennas to mitigate inherent RF impediments such as CFO and STO. While such processing has no effect on digital communication performance (e.g., it does not correct residual CFO for each receive chain), it cleans up the phase information when variation in phase due to human movement is of interest. An example of phase differences $\angle H_{1,p,k}[i] - \angle H_{0,p,k}[i]$ and $\angle H_{2,p,k}[i] - \angle H_{0,p,k}[i]$ are shown in FIG. 8, where $\angle$ denotes the phase of a complex number.

Referring to FIGS. 7 and 8, it is possible to see that the amplitude and phase of CSI contains rich information about human movements which can be used for presence detection. However, the closed form relation between the variation in wireless channel and the movement of scatters is still an open question. Also, since the behavior and location of a human are often unpredictable, relying only on one or several features is not reliable and can limit applicable scenarios.

System 10 is thus configured to apply neural network (NN) to CSI based presence detection since it does not require the mathematical model of the problem and can learn features automatically. Referring to FIG. 9, consecutive CSIs are first stacked up into CSI images 70. The amplitude and phase of the CSI images 72 and 74 are then processed separately and fed into the CNN 76. The post-processing block 78 accumulates the instantaneous detection results provided by the CNN and output a final presence detection decision. Since detection is based on variation of H[i] over time, for each input to the CNN, L consecutive CSIs are collected, H[0], . . . , H[L−1], and then stacked in the temporal domain into matrix X:

$$X = [H[0], \ldots, H[L-1]]^T \quad (6)$$

where $X \in \square^{L \times N_r \times N_t \times N_{sc}}$.

The amplitude and phase information are then extracted from X and fed into two CNNs separately. Denote by $A^{abs}[0]$ and $A^{phase}[0]$ the input to the two CNNs, respectively.

To extract CSI amplitude, first denote by reshape(·) the reshape function for a multi-dimensional matrix. The reshape function combines axes corresponding to transmit and receive antennas into one and interchange the second and the third axis of the resulting 3-D) matrix. Let $X^{abs} =_{reshape}(|X|)$, where $X^{abs} \in \square^{L \times N_{sc} \times (N_r N_t)}$.

There are several reasons that suggest not using $X^{abs}$ as the input of CNN directly. First, the range of $X^{abs}$ varies as the environment changes. Given limited sample size, the CNN may extract features that are strongly correlated to the absolute amplitude of $X^{abs}$. As a result, significant performance loss might be observed when test data is collected on certain days. This problem can be solved by either collecting more data on various channel conditions or applying further signal processing methods to remove the information on the actual range of $X^{abs}$. In this paper, signal processing approaches are used to solve this problem. In order to eliminate the information regarding the absolute amplitude, $X^{abs}$ is normalized by $$\tilde{X}_{i,:,:}^{abs} = X_{i,:,:}^{abs} . / X_{0,:,:}^{abs} \quad (7)$$

where ./ denotes element-wise division.

Second, high frequency noise is introduced in $\tilde{X}^{abs}$ due to non-ideal hardware. Our experiments show that even though all scatters are static in the environment, non-continuity between $H_{q,p,k}[i]$ and $H_{q,p,k}[i+1]$ can still be observed which might lead to detection error. On the contrary, the human movement is always slow and continuous. Hence, Fourier transform can be used to focus analysis on impacts from low frequency ranges while excluding high frequency noise. The two-dimensional FFT (2-D FFT) of $\tilde{X}^{abs}$ for each antenna pair is denoted by $X^{abs\text{-}fft}$. Then $X^{abs\text{-}fft}$ is given by $$X_{:,:,j}^{abs\text{-}fft} = F(\tilde{X}_{:,:,j}^{abs}) \quad (8)$$

Then, the zero frequency component of $X^{abs\text{-}fft}$ is shifted to the center of the array. FIG. 10 provides a sample of $X^{abs\text{-}fft}$ collected in a human-free room and in the same room but with human motions, respectively. One can see that the 2-D FFT result given an empty room concentrate more around the center, and human movement only spreads the energy within low frequency components.

To exclude high frequency change which may result from factors irrelevant to human motions such as hardware impairment and channel estimation error, only part of $|X^{abs\text{-}fft}|$ close to the center of $|X^{abs\text{-}fft}|$ will be kept. Denote by $X^{abs\text{-}fft\text{-}crop}$ the cropped $|X^{abs\text{-}fft}|$, which is given by $$X_{i,:,:}^{abs\text{-}fft\text{-}crop} = X_{(I-T)/2+i,:,:}^{abs\text{-}fft} \quad (9)$$

where i=0, . . . , T−1 and T is the cropping window size. Without loss of generality, here it can be assumed that T is an even number.

Due to factors such as CFO and STO, the phase of CSI obtained from different frames can change abruptly in the range [−π, π]. If we unwrap the phase of $H_{q,p,k}[i]$ over i, its behavior might be totally different even in the exactly same environment, as shown in FIG. 11. Thus, even though phase is sensitive to small changes in the environment, presence information in its variation over time is corrupted by distortion. However, since CFO and STO introduce constant phase offset for all antennas at the same time index, given fixed p and k, the phase difference between $H_{q,p,k}[i]$ for different q are relatively stable over i when all the scatters are stationary. On the other hand, large variation can be observed once human behaviors change existing spatial relationship of H[i] as shown in FIG. 8.

Denote by $X^{phase}$ the phase difference between $H_{q,p,k}[i]$ for different q:

$$X_{i,q-1,:,:}^{phase} = \angle(H_{q,:,:}[i]/H_{0,:,:}[i]) \quad (10)$$

The dimension of $X^{phase}$ is changed to $L \times N_{sc} \times (N_r-1)N_t$ by using the reshape (•) function followed by phase unwrapping along time axis in order to remove discontinuity around the boundary point −π and π. Contrary to 2-D FFT done to CSI amplitude, we perform 1-D FFT to $X^{phase}$ along time index, since the phase relation among different subcarriers no longer exists after the phase unwrapping procedure. $X^{phase\text{-}fft}$ is calculated by $$X_{:,i,j}^{phase\text{-}fft} = F(X_{:,i,j}^{phase}) \quad (11)$$

One example of $X^{phase\text{-}fft}$ is given in FIGS. 12 and 13.

The following steps are similar to how $X^{abs\text{-}fft\text{-}crop}$ is obtained, where the zero frequency component is shifted to the center of the array and only the center amplitude values are kept. Denote by $X^{phase\text{-}fft\text{-}crop}$ the cropped $|X^{phase\text{-}fft}|$, which is given by $$X_{:,i,j}^{phase\text{-}fft\text{-}crop} = X_{(I-T)/2+i,:,:}^{phase\text{-}fft} \quad (12)$$

where T is the cropping window size as for obtaining $X^{abs\text{-}fft\text{-}crop}$ After FFT, dynamic range of $X^{abs\text{-}fft\text{-}crop}$ and $X^{phase\text{-}fft\text{-}crop}$ can be very large such that elements with low intensity is easily overwhelmed by ones with large values. Therefore, for image normalization, the logarithmic operator log(•) can be applied to each element in both images, which is defined as $$y = \log_{10}(x+1) \quad (13)$$

where x≥0. Then, the input of the two parallel CNNs are given by $$A^{abs}[0] = \log_{10}(X^{abs\text{-}fft\text{-}crop}+1)$$

$$A^{phase}[0] = \log_{10}(X^{phase\text{-}fft\text{-}crop}+1) \quad (14)$$

The architecture of an exemplary CNN for use in the present invention is seen in FIG. 14. More specifically, amplitude and phase images 80 and 82 are fed into two parallel CNNs which share the same structure given in Table I.

TABLE I

CNN for amplitude/phase image layout

| Name | Parameters |
|---|---|
| Conv Layer 1 | kernel number: 12<br>kernel size: (3, 3); stride: (1, 1)<br>activation: ReLU |
| Batch Norm | NA |
| Pooling Layer 1 | kernel type: average<br>kernel size: (2, 1); stride: (2, 1) |
| Conv Layer 2 | kernel number: 12<br>kernel size: (4, 4); stride: (1, 1)<br>activation: ReLU |
| Batch Norm | NA |
| Pooling Layer 2 | kernel type: average<br>kernel size: (3, 1); stride: (3, 1) |
| Flatten Layer | NA |
| Dropout Layer | dropout probability: 0.5 |
| FC Layer 1 | neuron number: 32<br>regularization: $I_2$, $\lambda = 0.02$<br>activation: ReLU |
| Batch Norm | NA |

The output of the two CNNs are then concatenated as illustrated in block 84 and fed to the output layer given in Table II.

TABLE II

FC layers after two parallel CNNs layout

| Name | Parameters |
|---|---|
| Concatenation | NA |
| Dropout Layer | dropout probability: 0.5 |
| Output Layer | neuron number: 2<br>regularization: $I_2$, $\lambda = 0.02$<br>activation: Sigmoid |

Details about each layer involved in the proposed system are described below. The input of the l-th layer is denote by $A^{[l]}$ or $a^{[l]}$ depending on whether the input is a matrix or vector for the l-th layer. Note that the output of the l-th layer is the input of the (l+1)-th layer.

A convolution layer is considered as the l-th layer of the CNN. Assuming that the input $A^{[l-1]}$ has size $(n_h^{[l-1]}, n_w^{[l-1]}, n_c^{[l-1]})$. Denote by $K^{[l](u)} \in \square^{d_h^{[l]} \times d_w^{[l]} \times d_c^{[l]}}$ for $u = 0, \ldots, U-1$ the kernel functions of the u-th output channel, where $n_c^{[l-1]} = d_c^{[l]}$. In the following explanation, $d_c^{[l]}$ is omitted if no ambiguity occurs. Each kernel, $K^{[l](u)}$, slides through the input image according to the predefined step size called stride $(s_h, s_w)$. At each location, the summation of the element-wise dot product between the kernel $K^{[l](u)}$ and its covered part of $A^{[l-1]}$ is calculated, and the result scalar is assigned to the corresponding position in the u-th output channel. The output of this Conv layer generated by $K^{[l](u)}$, denoted by $$Z_{i,j,u}^{[l]} = \sum_{q,t,d} A_{is_h^{[l]}+q, js_w^{[l]}+t, d}^{[l-1]} K_{q,t,d}^{[l](u)} + b_u^{[l]} \quad (15)$$

where $b_u^{[l]}$ is the learnable bias term corresponding to $K^{[l](u)}$. FIG. 15 shows an example of how $Z^{[l]}$ is calculated, where only one kernel with size (2,2) and stride (1,1) is applied to the input and the bias term is assumed to be zero. By applying the same kernel functions to different locations in the input, Conv layer effectively captures similar features across the input image and at the same time significantly reduce the number of parameters to be learned during the training phase. In the proposed system, kernel sizes for the Conv layers 1 and 2 are (3,3) and (4,4) respectively and 12 kernels are used for each Conv layer. Due to small image size, stride always equals to (1,1) for the proposed CNN.

The activation function of the l-layer which will be described herein in defines as $g^{[l]}(\bullet)$. The output of the l-th (Conv) layer is given by $$A_{i,j,u}^{[l]} = g^{[l]}(Z_{i,j,u}^{[l]}) \quad (16)$$

In CNN, each Conv layer is usually followed by a pooling layer. In each pooling layer, a pooling window scans through the input image with a pre-defined stride. At each location, the generated output is a single value for each channel. Two common pooling functions are max-pool and average-pool. In the max-pool, maximum value within the rectangular region is kept, while in the average-pool, average value is calculated. Pooling layers not only help reduce the input dimension, but also make the system more robust against variation within small regions in the image since the output only keeps the most dominant or average features. FIG. 16 contains one simple pooling layer where only average value in the window size of (2; 2) is sent to the output. In the exemplary CNN of the present invention, Conv layers 1 and 2 are followed by average pooling layers with pooling size (2, 1) and (3, 1) respectively.

Due to the large size of training set, input data is divided into disjoint mini-batches with size $N_{mb}$ for batch normalization (Batch Norm). When normalization is applied, features are normalized by their mean and variance in the current batch.

Suppose that the l-th layer is a Batch Norm layer. Let $a^{[l-1]}[i]$ denote the i-th sample in the current mini-batch which has K features. Then the normalized samples are given by $$y_k^{[l]}[i] = \frac{a_k^{[l]}[i] - \mu_k^{[l]}}{\sqrt{\left(\sigma_k^{[l]}\right)^2 + \varepsilon}} \quad (17)$$

where $\varepsilon$ is a small positive number, $k = 1, \ldots, K$, and $$\mu_k^{[l]} = \frac{1}{N_{mb}} \sum_{i=1}^{N_{mb}} a_k^{[l]}[i], \quad (18)$$

$$\left(\sigma_k^{[l]}\right)^2 = \frac{1}{N_{mb}} \sum_{i=1}^{N_{mb}} \left(a_k^{[l]}[i] - \mu_k^{[l]}\right)^2$$

The output of the batch normalization layer is $$a^{[l]}[i] = \gamma^{[l]} y^{[l]}[i] + \beta^{[l]} \quad (19)$$

where $i = 1, \ldots, N_{mb}$, and $\gamma^{[l]}, \beta^{[l]}$ are learnable parameters.

Batch Norm is added after each layer that has trainable parameter in the proposed system. By centering data, batch norm can speed up training and make the model more robust to variations in the input distribution.

Dropout is a technique used during training phase to help prevent overfitting. When dropout is added after layer l, some output units of layer l are muted according to pre-defined dropout probability. This kind of random selection forces weights assigned by layer l+1 to spread out across all input neurons instead of focusing on just a small set of them. In the CNN for amplitude/phase images, a dropout layer with dropout probability 0.5 is inserted before the fully connected layer. At the same time, right after concatenation, a dropout layer is also added to make sure the neural network can learn the contribution from phase and amplitude equally.

In the last a few layers in the proposed CNN, high-dimensional outputs are first flatten into vectors, and such vectors serve as inputs to the following fully-connected layers where all the input units are directly connected to the hidden neurons to form a fully-connected (FC) layer. Suppose that the l-th layer is a fully-connected layer. Denote by $z^{[l]}$ the output of the l-th layer before the activation function. Then $$z^{[l]} = W^{[l]} a^{[l-1]} + b^{[l]} \qquad (20)$$

where $W^{[l]}$ and $b^{[l]}$ are the weights and bias assigned to neurons from layer l to layer l+1. Then the output of the l-th layer is given by $$a_i^{[l]} = g^{[l]}(z_i^{[l]}) \qquad (21)$$

The system of the present invention consists of two kinds of FC layers including the output layer. The number of neurons of each layer is 32 and 2, respectively.

Activation functions are nonlinear functions added to the output of each neuron. Two activation functions are used in this paper—rectified linear unit (ReLU) and softmax. Given the input $x \in \mathcal{R}$ to the activation function. The output of ReLu is given by $$g^{ReLu}(x) = \begin{cases} x & \text{if } x > 0, \\ 0 & \text{if } x \leq 0 \end{cases} \qquad (22)$$

Suppose the number of class to be classified is C. Assume that $x \in \square^C$ are the input to the softmax function. Then the output is given by $$g_c^{soft}(x) = \frac{e^{x_c}}{\sum_{j=0}^{C-1} e^{x_j}} \qquad (23)$$

where c=0, ..., C−1. $g_c^{soft}(\square)$ only used in the output layer. Hence, $g_c^{soft}(\square)$ can be viewed as the probability that the input belongs to the c-th class. For presence detection, C=2, and using softmax and sigmoid function are equivalent.

The categorical cross-entropy is used as the loss function for the proposed CNN. Suppose there are $N_d$ CSI images. The probability that the i-th CSI image belongs to the c-th class is denoted by $p_{i,c}$ and predicted by the proposed CNN. Then the categorical cross-entropy is given by $$L_o = -\frac{1}{N_d} \sum_{i=1}^{N_d} \sum_{c=0}^{1} y_c[i] \log(p_{i,c}) \qquad (24)$$

where $y^{[i]}$ is a one-hot vector corresponding to the ground truth. That is, with binary classification, $y^{[i]}$ is length-2 vector whose non-zero entry corresponding to the true label of the i-th CSI. For example, $y_0[i]=1$ and $y_1[i]=0$. imply the true label of the i-th sample is 0 whereas $y_0[i]=0$ and $y_1[i]=1$ imply the true label of the i-th sample is 1.

In addition to categorical cross-entropy, $l_2$ regularization is used in each fully-connected layer to prevent overfitting. Thus, the overall loss function is given as $$L = L_o + \frac{1}{2N_d} \sum_{l \in B} \lambda_l \|W^{[l]}\|_F^2 \qquad (25)$$

where $\|\bullet\|_F$ denotes the Frobenius norm of the matrix, $\lambda_l$ is a tunable parameter and set B contains indexes of all FC layers.

The output of the CNN corresponding to the i-th CSI image, y[i] is given by $$y[i] = \underset{c \in \{0,\ldots,C-1\}}{\operatorname{argmax}} p_{i,c} \qquad (26)$$

In training and evaluating the proposed CNN off-line, no post-processing is performed for the output y[i] in order to get an accurate performance of the model.

When deploying the model to detect human presence in real-time where CSI streams keep feeding into the system, without post-processing, the system will provide presence information for every newly received CSI image, e.g., 100 predictions per second in our setting. However, since the human movement always lasts for certain time interval, e.g. one second, it is reasonable to assume that a significant portion of detection results provided by the CNN within the time interval should be positive if there exist human movements. Therefore, instead of reporting result per image, we use majority rule and provide one final detection result per time interval.

EXAMPLE

An exemplary communication system comprises a laptop (Thinkpad T410) as WiFi access point (AP) and one desktop (Dell OptiPlex 7010) as WiFi client. An Atheros 802.11n WiFi chipset, AR9580, and Ubuntu 14.04 LTS with built-in Atheros-CSI-Tool were installed on both computers. In the experiments, the AP sends packets at the rate of 100 pkts/s, while the client is recording CSIs using Atheros-CSI-Tool, i.e., the CSI sampling interval is roughly 10 ms. For each CSI, information from all 3 transmit antennas and 3 receive antennas were obtained and 14 evenly spaced subcarriers were extracted out of 56 subcarriers in a 20 MHz channel operating at channel 6 in the 2.4 GHz frequency band.

The diagram of the indoor environments used for testing the exemplary system are shown in FIGS. 17 and 18, where the transmitter and receiver are denoted by Tx and Rx respectively. There were multiple monitors on desks and multiple chairs on the floor which are not shown in this figure since their position may change in different days. Notice that since the transmit antennas are behind the metal lid of the laptop and the receive antenna array is surrounded by a lot of other computers, as seen in FIGS. 17 and 18, strong line of sight components between transmitter and receiver is alleviated.

To generate input images to the CNN of the present invention, 128 consecutive CSI (L=128) were collected, which lasts for around 1.27 s. Due to unknown hardware issues, some entries of H[i] can suddenly drop to zero, which is not expected given the continuity of the operating environment. Such H[i] s are excluded from constructing CSI images, since they can introduce abnormal samples and also cause inconvenience when the phase offset needs to be extracted as in Equation (4). Due to WiFi packet scheduling/hardware timing error, duration of each image can have large variation. A CSI image is valid if it satisfies the following two conditions:

(1) every entry of |X| is >0

(2) time difference between the last and the first frame lies within 1.27±0.064 s In the experiment, $A^{abs}[0]$ and $A^{phase}[0]$ are of size 50×14×9 and 50×14×6 respectively, i.e., T=50 in Eq. (9) and Eq. (12).

Data collected in the human-free lab is labeled as 0. However, collecting presence data for training is more challenging. If presence data is collected when someone just shows up in the room, constructed CSI images might corresponds to either human movements or stationary humans. Since the proposed presence detection system depends on human movements, the CSI image that corresponds to stationary human needs to be label as 0 whereas that involves human movements should be labeled as 1. This entire labeling process is time consuming and requires accurate time alignment between the movement and the CSI image. Therefore, in the system, the training data with label 1 is collected when one person is walking randomly in the room. One may doubt about the performance of the proposed CNN given the fact that the majority of human motions in the indoor environment is much smaller than walking. However, the experiment results show that the proposed CNN is sensitive to subtle motions and outperforms PIR sensor even though the training data contains only large-scale motion.

Since the wireless channel evolves over time itself and different experimental runs are also accompanied by distinguishable features such as CFO and STO, to rule out the possibility that CNN captures features irrelevant to human presence, data is collected on different days and in each day, the data collection is divided into disjoint runs. Furthermore, the training and test data come from disjoint days.

The proposed CNN was built under Keras with Tensorflow as the backend and trained using Adam optimizer. Training and off-line testing were performed by a Linux server with a 12-core E5-2650 CPU at 2.20 GHz and 125.8 GB of RAM. One-line detection was conducted on the WiFi receiver (Dell desktop) with a 4-core i7-3773 CPU at 3.4 GHz and 7.8 GB of RAM.

The CNN of the present invention was validated by testing on large-scale motion offline without post-processing to get the instantaneous detection performance of the model. CSIs were collected in 13 days, which are summarized in Table IV. All the data with label 1 corresponds to large motions such as random walking. In the first three days, experiments were conducted in lab I, while for the remaining nine days, experiments were conducted in lab II. The floor plan of two labs is shown in FIGS. 17 and 18, respectively. Two validation steps were used to demonstrate the effectiveness of the model in capturing features relevant to human presence.

In validation I, the proposed CNN with 55078 parameters was trained using data from days 6-11 and the resulting model is denoted by model I. The number of training data in each class is summarized in Table III.

TABLE III

Training set composition

| Model name | Label 0 | | Label 1 | |
| --- | --- | --- | --- | --- |
| | days | size | days | size |
| model I | 6-11 | 39866 | 6-11 | 41276 |
| model II | 3, 6-11 | 24642 | 3, 6-11 | 25584 |
| model III | 16, 6-11 | 50753 | 6-11 | 41276 |

TABLE IV

Data set composition

| Days | Location | Date (in 2019) |
| --- | --- | --- |
| 1-3 | Lab I | Sep. 15 to Sep. 22 |
| 4-5 | Lab II | Oct. 10 to Oct. 30 |
| 6-13 | Lab III | Nov. 26 to Dec. 5 |

Model I was then tested on data in the remaining 7 days. Test results are summarized in the Table. V. No significant performance loss is observed on test data in Lab II.

TABLE V

Test accuracy per day

| | Label 0 | | | Label 1 | | |
| --- | --- | --- | --- | --- | --- | --- |
| Days | size | model I | model II | size | model I | model II |
| 1 | 4938 | 93.42% | 99.39% | 5206 | 100% | 100% |
| 2 | 4923 | 97.46% | 97.99% | 5231 | 100% | 100% |
| 3 | 5025 | 99.88% | 99.98% | 5201 | 99.96% | 99.98% |
| 4 | 5480 | 100% | 100% | 6843 | 100% | 100% |
| 5 | 5476 | 100% | 100% | 5234 | 99.89% | 99.92% |
| 12 | 6484 | 100% | 99.94% | 6092 | 100% | 100% |
| 13 | 7164 | 100% | 100% | 7023 | 99.96% | 99.93% |

Notice that days 4-5 were done around one month earlier than training data was collected. Not only the wireless channel is different, but also the lab settings, e.g., the placement of the transceiver and number of surrounding objects, are not the same. The test result shows that the proposed CNN is robust to the environment changes over time. However, performance is disparate from day to day when moving a different location, Lab I. False alarm ratio in day 1 is 6.58%, while in day 3 it is as low as 0.04%. This is because the training data does not contain any information of Lab I. To feed the CNN with knowledge about the new environment, another model, model II, is obtained by combining data on day 3 which already has good performance under model I with 40000 randomly chosen samples from the previous training set as given in Table III. The performance of model II is presented in Table V. One can see that just by adding a small set of data, the model is able to adapt to new environment quickly without sacrificing performance in the old environment.

In validation II, on each day, the experiment was divided into multiple runs. Up until then, training and test data came from runs that entirely correspond to either an empty room or human movements. That is, data from one run is labeled all as 0 or 1. To further rule out the possibility that the proposed system classifies data by the similarity of the hardware status, more runs were conducted, called mixture runs, on each day for validation purpose only. Each mixture run lasts for 5 minutes and is divided into five one-minute intervals. The ground truth of each interval in the same mixture run is not identical.

Detection results of mixture runs on day 1, 3, 5, 14 are given in FIG. 19. The CSI step size was set to be 23, thus each 1-minute interval corresponds to around 260 images. Instead of using predicted labels, presence detection probability of each image is shown to give a more accurate detection performance. As seen in FIG. 19, the model can successfully catch the state change in a single run, thus it indeed captures features relevant to human presence to do the detection.

Before performing a real-time test, model I was first evaluated by 3 days' data consisting of small scale motions, e.g., waving arms, indexed by day 14-16 respectively. As shown in Table.VI, for the motions that never appear in the training set, the model is also able to give accurate detection result.

TABLE VI

Test accuracy on data set consists of small scale motions

| | Label 0 | | Label 1 | |
|---|---|---|---|---|
| Day | size | model I | size | model I |
| 14 | 5396 | 100% | 4992 | 99.94% |
| 15 | 5447 | 100% | 5044 | 98.83% |
| 16 | 10887 | 99.95% | 4718 | 97.54% |

In order to get a model that is robust enough for long-term test, all the data was examined closely to find that the output presence probabilities of human-free data collected on day 16 are closer to 0.5 than others. Therefore, besides data collected in day 6-11, label 0 data on day 16 was included in the training set to get the final model, denoted by model III and shown in Table III. The model III was then deployed to the WiFi receiver and run on edge in real-time.

As a conventional way of presence detection, PIR sensors are capable of detecting human as long as they have any motion behaviors by monitoring the changes in the amount of infrared radiation from humans impinging upon it. Since PIR sensors are known for its sensitivity and low false alarm in a small covered range, it is meaningful to compare the performance of the proposed system with the PIR sensor.

A camera was used in the lab to provide ground truth as shown in FIG. 18. One PIR sensor, Honeywell DT8035, was mounted on the shelf at one side of the room with height of 6.8 ft. as in FIG. 18 to perform side-by-side comparison. Note that DT8035 also has microwave built in, but only output signals corresponding to PIR detection result we extracted. Since the coverage range of this PIR sensor is 40 ft.×56 ft. which is larger than our room dimension 13 ft.×39 ft., installing one is enough to detect all human motions inside. Moreover, the PIR sensor's coverage is a conical shape, so the distance to it has to be ≥7 ft. for it to cover the entire width of the room. To avoid appearing in the blind spot of the PIR sensor, throughout the experiment, human activities were restricted to the left hand side of the room without exceeding the dashed line shown in FIG. 18.

Since human movements are usually continuous for a short time period, e.g., 1 second, it is reasonable to compare the aggregate detection results rather than the instantaneous ones. Consider the detection results provided by the proposed CNN within a one-second interval. The number of detection results is around 100. The one-second interval is further divided into five 200 ms sub-intervals. The detection results are assigned to the sub-intervals according to the timestamp of the last H[i] in the input CSI image. For each sub-interval, the aggregate detection result is positive if at least 10 instantaneous results are positive. The final detection result for the one-second interval is positive if at least 3 sub-intervals are positive. Moreover, since the PIR sensor usually outputs its detection result 2-5 times every second, the aggregate detection result for a one-second interval is positive if at least one instantaneous detection result is positive.

Experiments were conducted to compare false alarm rates. The tests consisted of 3 days, indexing by days 17-19, when lab II is empty. Results shown in Table VII are the number of one-second intervals in which presence is detected by CNN and PIR sensor.

TABLE VII

Empty Room False Alarm Count (seconds)

| day | index | duration | CNN | PIR |
|---|---|---|---|---|
| 17 | 1 | 8 hrs | 2 s | 0 s |
| | 2 | 20 mins | 0 s | 0 s |
| | 3 | 9 hrs | 1 s | 0 s |
| 18 | 1 | 8 hrs | 0 s | 0 s |
| | 2 | 9 hrs | 0 s | 0 s |
| 19 | 1 | 12 hrs | 0 s | 0 s |

Since the normal usage of the lab could not be interrupted, a single test on some days could last for very long. For example, on day 17, the entire test was broken into three periods, and the shortest one, lasting for 20 mins, falls into lunch period, 12:10 pm to 12:30 pm. During the entire test that lasts for around 46.5 hrs, the proposed system only reported false positive three times, which yields false alarm rate of $1.8 \times 10^{-5}$. Therefore, in a human-free environment, the designed system can give detection results that are comparable to PIR sensor.

After making sure that the system has a very low probability of raising false alarm, in this part, the sensitivity of the system to human presence was evaluated. The experiments were performed when people are in the lab and performing their normal daily activities without introducing large motions intentionally. Most of the time, people just sit in front of the computer. Therefore, such test scenarios are similar to what will happen in a realistic office environment. 5 tests were performed in days 17 and 18. The duration of each test and presence count reported by CNN and PIR are summarized in Table VIII.

TABLE VIII

Presence Count (seconds)

| day | test index | duration | CNN | PIR |
|---|---|---|---|---|
| 17 | 1 | 1800 s | 208 s | 119 s |
| | 2 | 1800 s | 72 s | 26 s |
| 18 | 1 | 2340 s | 113 s | 48 s |
| | 2 | 1800 s | 68 s | 41 s |
| | 3 | 1800 s | 18 s | 11 s |

FIGS. 20 through 22 plots detection results of 3 tests done on day 18. All the tests have at least one person present in the lab from beginning to the end, except test 1 on day 18 when the lab was empty for the first 20 mins. Human behaviors detected by CNN but not by PIR are highlighted via rectangular ranges in FIGS. 20 through 22, with only highlight of the part that is not detected by PIR sensor once in a large time window for the sake of clarity. For the clustering human behaviors, such as that happened at around 1200 s in FIG. 20, even though CNN is able to detect presence for a longer period of time, it was not highlighted in the figure. To compare the sensitivity of two systems more accurately, one can use presence counts given in Table VIII.

By looking at video recordings, all the presence detected in the highlighted ranges in FIGS. 20 through 22 were indeed triggered by human behaviors, such as stretching while sitting, adjusting sitting postures and discussing with lab mates. Almost all these motions are subtle and happen in a limited range. Even though there are still some behaviors missed by CNN such as moving head slowly and typing, we show that the model is capable of detecting many kinds of human actions even though we only include random walking in the training set and such capability lets it outperform the PIR sensor in terms of detecting presence.

For all of the experimental results, the CSI sampling interval was set to be 10 ms. To know how the choice of sampling interval impacts the detection accuracy, the model I is retrained under two more sampling intervals, 20 ms and 40 ms. Throughout this test, the duration of each CSI image remains 1.27 s but with different number of samples, i.e., 128, 64 and 32 samples under sampling interval 10 ms, 20 ms and 40 ms, respectively. Before performing FFT, both $X^{abs}$ and $X^{phase}$ are zero padded accordingly such as their temporal domain dimension L=128. The performance comparison is given in Table IX.

TABLE IX

Impact of sampling interval

| | Label 0 | | | Label 1 | | |
|---|---|---|---|---|---|---|
| Days | 10 ms | 20 ms | 40 ms | 10 ms | 20 ms | 40 ms |
| 1 | 93.42% | 88.85% | 78.32% | 100% | 99.94% | 100% |
| 2 | 97.46% | 95.84% | 91.66% | 100% | 99.77% | 100% |
| 3 | 99.88% | 99.21% | 97.42% | 99.96% | 99.83% | 99.85% |
| 4 | 100% | 100% | 100% | 100% | 100% | 100% |
| 5 | 100% | 100% | 99.96% | 99.89% | 99.85% | 100% |
| 12 | 100% | 99.78% | 97.07% | 100% | 100% | 99.98% |
| 13 | 100% | 99.99% | 99.76% | 99.96% | 99.87% | 99.89% |
| 16 | 99.95% | 98.15% | 86.67% | 97.54% | 99.50% | 99.77% |

For tests done in lab II, as the sampling rate decreases, the system was still able to achieve high accuracy except day 12 and 16 when the accuracy of detecting human-free environment drops to 97.07% and 86.67%, respectively, when there are only 32 samples in one CSI image. Moreover, when big environment changes occur such as moving to lab I in day 1-3, as seen in the table, more samples per CSI image helps preserve the robustness of the system and provide low false alarm rate.

We further investigate the benefits of the proposed architecture as opposed to similar systems but with CSI magnitude only of CSI phase only. Using the dataset from day 6-11, two models were obtained which only use amplitude and phase images as inputs, respectively. Their performance comparisons are given in Table X.

TABLE X

Accuracy of different inputs

| | Label 0 | | | Label 1 | | |
|---|---|---|---|---|---|---|
| Days | both | abs | phase | both | abs | phase |
| 1 | 92.42% | 91.21% | 92.35% | 100% | 100% | 99.56% |
| 2 | 97.46% | 96.30% | 96.47% | 100% | 100% | 96.79% |

TABLE X-continued

Accuracy of different inputs

| | Label 0 | | | Label 1 | | |
|---|---|---|---|---|---|---|
| Days | both | abs | phase | both | abs | phase |
| 3 | 99.88% | 99.24% | 99.42% | 100% | 100% | 95.83% |
| 4 | 100% | 100% | 99.53% | 100% | 100% | 99.43% |
| 5 | 100% | 100% | 99.67 | 99.89% | 99.81% | 99.20% |
| 12 | 100% | 99.98% | 99.61% | 100% | 100% | 99.34% |
| 13 | 100% | 100% | 99.68% | 99.96% | 99.87% | 95.93% |
| 14 | 100% | 100% | 99.65% | 99.94% | 99.96% | 96.64% |
| 15 | 100% | 100% | 99.58% | 98.83% | 99.23% | 90.96% |
| 16 | 99.95% | 99.99% | 99.21% | 97.54% | 98.43% | 80.09% |

In terms of accuracy of detecting an empty environment, all three input methods give satisfactory results especially in Lab II environment. For detecting presence, amplitude image has highest sensitivity of all even in day 14-16 when motions are small, while phase information is less likely to tell human presence in some instances. Performance of combing two inputs is even dragged down a little by phase image in day 15-16. However, such little scarification in detecting accuracy makes system have lower false alarm rate. FIGS. 23 and 24 gives two mixture runs on day 9 and 11, respectively. Due to the contribution of phase information, certain images that are wrongly detected as label 1 are able to be corrected when two images are used together. Such performance gain is also obvious in day 1-3 when devices are moved to Lab I, it can be seen from the table that the CNN with two inputs renders lowest false alarm rate among these three.

In generating amplitude images, we perform time domain normalization as in Eq. (7). According to experimental results, even without amplitude normalization, the system is able to give as good as results shown in Table V in lab I with slightly decreased label 0 accuracy in some test data such as data from day 16 shown in Table XI.

TABLE XI

Impact of abs normalization

| | Label 0 | | Label 1 | |
|---|---|---|---|---|
| Days | w/ | w/o | w/ | w/o |
| 3 | 99.88% | 94.05% | 99.96% | 100% |
| 16 | 99.95% | 99.05% | 97.54% | 97.29% |

Even though such performance degradation is very small, this is calculated based on the large sample size. In a real-time system, such false alarms can cause undesirable actions. In long-term real-time tests, it is found that such model can raise false alarms that are long enough to trigger presence detection in an empty environment. CSI images belonging to false alarms are saved and then analyzed off-line. It turns out that the model trained with amplitude normalization can predict correct labels for these images. An example of 100 images collected in one test night is shown in FIG. 25.

Additionally, large variation in environment such as moving to lab I on day 3 impacts performance of the model w/o normalization more severely compared with the model w/normalization as given in Table. XI. Therefore, the proposed amplitude normalization is helpful in making the system more robust against factors irrelevant to human behaviors.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises at least executable instruction for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for detecting motion using ambient radio frequency signals, comprising:
    a receiver having an antenna for receiving a series of ambient radio frequency signals;
    a processor associated with the receiver that is programmed to process the series of ambient radio frequency signals to obtain a series of channel state information arrays, to construct a channel state image by stacking the series of channel state information arrays, to process the channel state information image to form a channel state information phase image and a channel state information magnitude image, to independently process the channel state information phase image with a first convolutional neural network and the channel state information magnitude image with a second convolutional neural network, and to concatenate the results of the first convolutional neural network and the second convolutional neural network to provide an output layer indicating whether motion has been detected; and
    wherein the output layer indicates whether motion has been detected based on the variation of amplitude and phase of the series of ambient radio frequency signals over time; and
    wherein the first convolutional neural network comprises a first convolution layer, a first pooling layer, and a first dropout layer.

2. The system of claim 1, wherein the second convolutional neural network comprises a second convolution layer, a second pooling layer, and a second dropout layer.

3. The system of claim 2, wherein the processor is programmed to concatenate the results of the first convolutional neural network and the second convolutional neural network using a fully connected layer.

4. The system of claim 3, wherein the channel state information image has a sampling interval selected from the group consisting of 10 milliseconds, 20 milliseconds, and 40 milliseconds.

5. The system of claim 4, wherein the first convolutional neural network and the second convolutional neural network were trained using a set of training data obtained from a single object moving within a location having the series of ambient radio frequency signals.

6. A method detecting motion using ambient radio frequency signals, comprising the steps of:
    providing a receiver having an antenna for receiving a series of ambient radio frequency signals;
    using a processor associated with the receiver that is programmed to process the series of ambient radio frequency signals to obtain a series of channel state information arrays;
    using the processor to construct a channel state image by stacking the series of channel state information arrays;
    using the processor to process the channel state information image to form a channel state information phase image and a channel state information magnitude image;
    using the processor to independently process the channel state information phase image with a first convolutional neural network comprising a first convolution layer, a first pooling layer, and a first dropout layer and the channel state information magnitude image with a second convolutional neural network; and
    using the processor to concatenate the results of the first convolutional neural network and the second convolutional neural network to provide an output layer indicating whether motion has been detected, wherein the output layer indicates whether motion has been detected is based on the variation of amplitude and phase of the series of ambient radio frequency signals over time.

7. The method of claim 6, wherein the second convolutional neural network comprises a second convolution layer, a second pooling layer, and a second dropout layer.

8. The method of claim 7, wherein the step of using the processor to concatenate the results of the first convolutional neural network and the second convolutional neural network comprises using a fully connected layer.

9. The method of claim 8, wherein the channel state information image has a sampling interval selected from the group consisting of 10 milliseconds, 20 milliseconds, and 40 milliseconds.

10. The method of claim 9, further comprising the step of training the first convolutional neural network and the second convolutional neural network with a set of training data obtained from a single object moving within a location having the series of ambient radio frequency signals.

* * * * *